(12) United States Patent
Kimura et al.

(10) Patent No.: US 10,963,684 B2
(45) Date of Patent: Mar. 30, 2021

(54) INFORMATION PROCESSING APPARATUS AND NON-TRANSITORY COMPUTER READABLE RECORDING MEDIUM

(71) Applicant: FUJI XEROX CO., LTD., Tokyo (JP)

(72) Inventors: Shunichi Kimura, Kanagawa (JP);
Masanori Sekino, Kanagawa (JP);
Satoshi Kubota, Kanagawa (JP);
Takuya Sakurai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 179 days.

(21) Appl. No.: 16/120,618

(22) Filed: Sep. 4, 2018

(65) Prior Publication Data
US 2019/0294873 A1    Sep. 26, 2019

(30) Foreign Application Priority Data
Mar. 22, 2018  (JP) .................................. 2018-055172

(51) Int. Cl.
*G06K 9/00* (2006.01)
(52) U.S. Cl.
CPC ..... *G06K 9/00422* (2013.01); *G06K 2209/01* (2013.01)
(58) Field of Classification Search
CPC combination set(s) only.
See application file for complete search history.

(56) References Cited

U.S. PATENT DOCUMENTS

| 8,254,721 | B2* | 8/2012 | Tamura | H04N 1/00326 382/278 |
| 9,280,725 | B2* | 3/2016 | Kimura | G06K 9/72 |
| 2009/0097765 | A1* | 4/2009 | Kimura | G06K 9/48 382/243 |
| 2012/0066213 | A1* | 3/2012 | Ohguro | G06K 9/344 707/723 |
| 2016/0171298 | A1* | 6/2016 | Takeda | G06F 16/5866 382/176 |
| 2019/0294662 | A1* | 9/2019 | Kimura | G06F 40/174 |

FOREIGN PATENT DOCUMENTS

| JP | 2000-341414 A | 12/2000 |
| JP | 2001-016336 A | 1/2001 |
| JP | 2008-077337 A | 4/2008 |
| JP | 2016-212812 A | 12/2016 |

* cited by examiner

Primary Examiner — Tsung Yin Tsai
(74) Attorney, Agent, or Firm — Oliff PLC

(57) ABSTRACT

An information processing apparatus includes an acquisition unit that acquires process information associated with a reference image and regarding an input process performed by referencing the reference image, and a process decision unit that decides a content of a next input process to perform by referencing the reference image, on a basis of the process information acquired by the acquisition unit.

9 Claims, 20 Drawing Sheets

FIG. 5A

| DATA ENTRY ID | xx |
| IMAGE FILE NAME | yy |

INITIAL STATE

FIG. 5B

| DATA ENTRY ID | xx |
| IMAGE FILE NAME | yy |
| DATA INPUT RESULT | "ABC" |
| DATA INPUT METHOD | PERSON A |

1ST DISTRIBUTION RESULT

FIG. 5C

| DATA ENTRY ID | xx |
| IMAGE FILE NAME | yy |
| DATA INPUT RESULT | "ABC" |
| DATA INPUT METHOD | PERSON A |
| DATA INPUT RESULT | "BCD" |
| DATA INPUT METHOD | PERSON B |

2ND DISTRIBUTION RESULT

FIG. 5D

| DATA ENTRY ID | xx |
| IMAGE FILE NAME | yy |
| DATA INPUT RESULT | "ABC" |
| DATA INPUT METHOD | PERSON A |
| DATA INPUT RESULT | "BCD" |
| DATA INPUT METHOD | PERSON B |
| COMPARISON RESULT | NON-MATCHING |
| DATA INPUT RESULT | "CDF" |
| DATA INPUT METHOD | PERSON C |
| END | |

3RD DISTRIBUTION RESULT

FIG. 5E

| DATA ENTRY ID | xx |
| IMAGE FILE NAME | yy |
| DATA INPUT RESULT | "ABC" |
| DATA INPUT METHOD | PERSON A |
| DATA INPUT RESULT | "ABC" |
| DATA INPUT METHOD | PERSON B |
| COMPARISON RESULT | MATCHING |
| END | |

CASE OF MATCHING COMPARISON

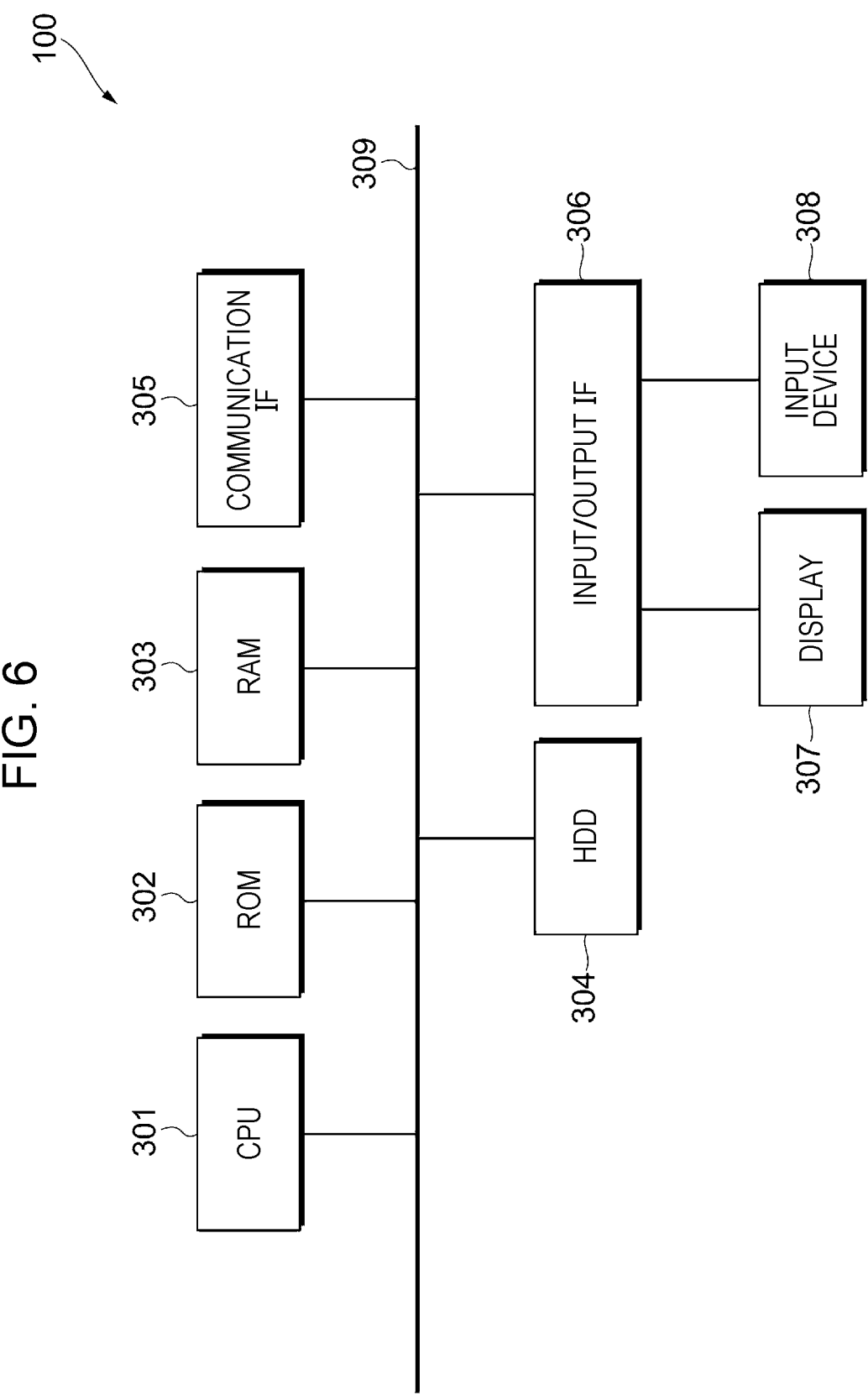

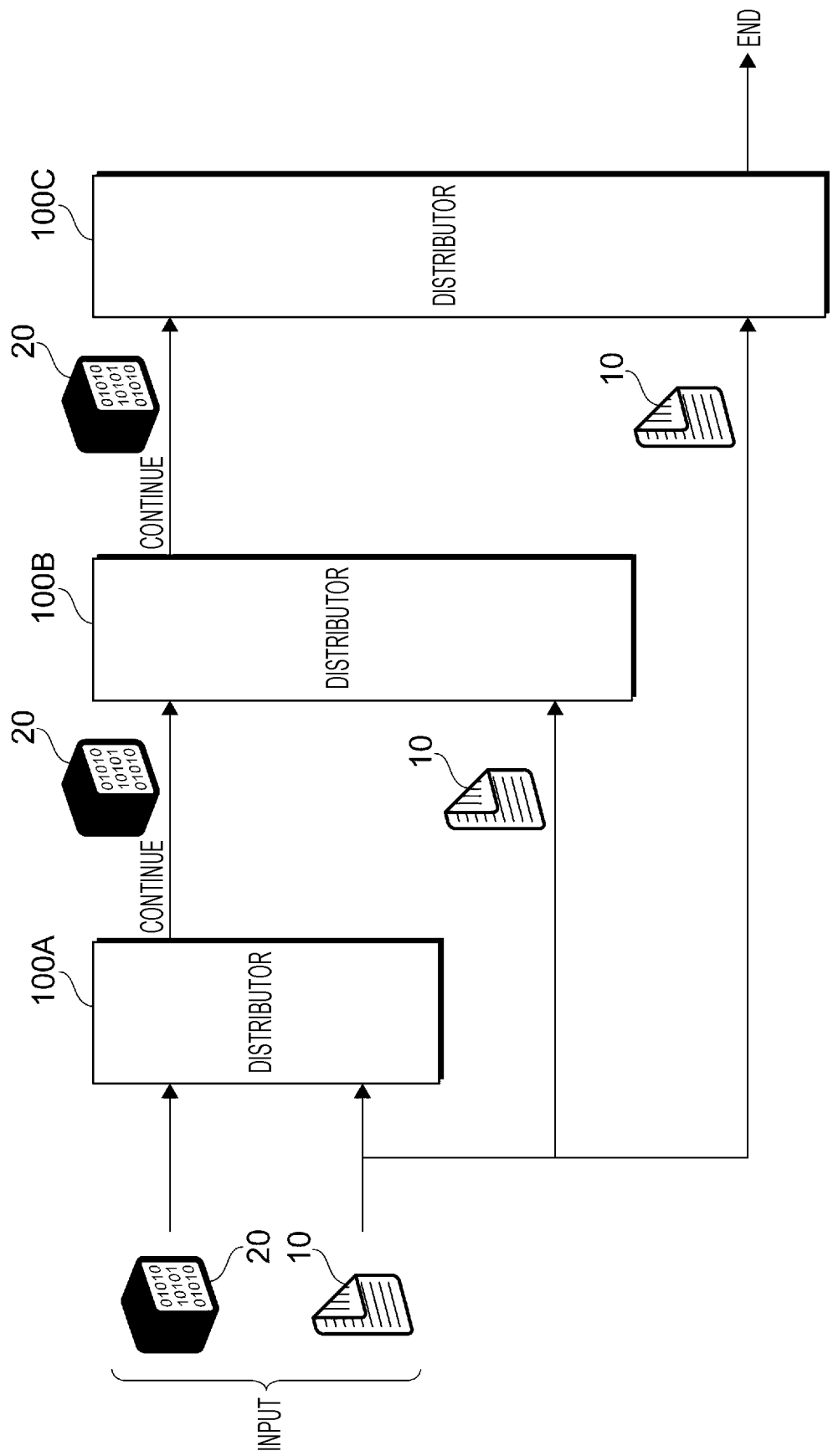

FIG. 10A

| DATA ENTRY ID | xx |
|---|---|
| IMAGE FILE NAME | yy |

INITIAL STATE

FIG. 10B

| DATA ENTRY ID | xx |
|---|---|
| IMAGE FILE NAME | yy |
| DATA INPUT RESULT | "ABC" |
| DATA INPUT METHOD | OCR |
| CERTAINTY | 0.9 |
| CHARACTER POSITION | XYHW |
| CHARACTER STRING POSITION | XYHW |

1ST DISTRIBUTION RESULT

FIG. 10C

| DATA ENTRY ID | xx |
|---|---|
| IMAGE FILE NAME | yy |
| DATA INPUT RESULT | "ABC" |
| DATA INPUT METHOD | OCR |
| CERTAINTY | 0.9 |
| CHARACTER POSITION | XYHW |
| CHARACTER STRING POSITION | XYHW |
| DATA INPUT RESULT | "BCD" |
| DATA INPUT METHOD | PERSON A |

2ND DISTRIBUTION RESULT

FIG. 10D

| DATA ENTRY ID | xx |
|---|---|
| IMAGE FILE NAME | yy |
| DATA INPUT RESULT | "ABC" |
| DATA INPUT METHOD | OCR |
| CERTAINTY | 0.9 |
| CHARACTER POSITION | XYHW |
| CHARACTER STRING POSITION | XYHW |
| DATA INPUT RESULT | "BCD" |
| DATA INPUT METHOD | PERSON A |
| COMPARISON RESULT | NON-MATCHING |
| DATA INPUT RESULT | "CDF" |
| DATA INPUT METHOD | PERSON B |
| END | |

3RD DISTRIBUTION RESULT

FIG. 10E

| DATA ENTRY ID | xx |
|---|---|
| IMAGE FILE NAME | yy |
| DATA INPUT RESULT | "ABC" |
| DATA INPUT METHOD | OCR |
| CERTAINTY | 0.9 |
| CHARACTER POSITION | XYHW |
| CHARACTER STRING POSITION | XYHW |
| DATA INPUT RESULT | "ABC" |
| DATA INPUT METHOD | PERSON A |
| COMPARISON RESULT | MATCHING |
| END | |

CASE OF MATCHING COMPARISON

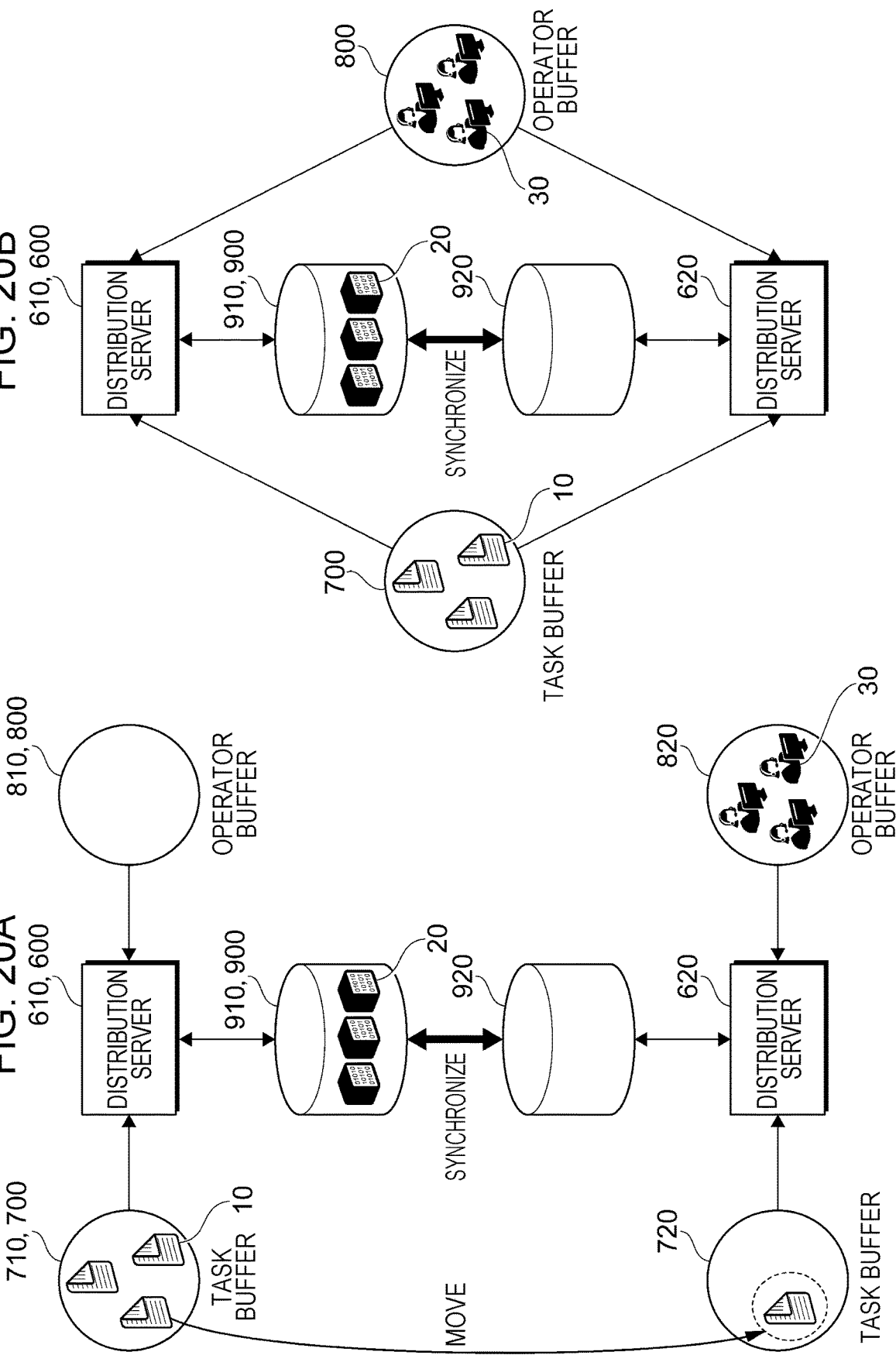

INFORMATION PROCESSING APPARATUS AND NON-TRANSITORY COMPUTER READABLE RECORDING MEDIUM

CROSS-REFERENCE TO RELATED APPLICATIONS

This application is based on and claims priority under 35 USC 119 from Japanese Patent Application No. 2018-055172 filed Mar. 22, 2018.

BACKGROUND (i) Technical Field

The present disclosure relates to an information processing apparatus and a non-transitory computer readable recording medium.

(ii) Related Art

Japanese Unexamined Patent Application Publication No. 2000-341414 describes a communication control apparatus for connecting an incoming call from a client to an operator selected from among multiple operators. The communication control apparatus is provided with a time prediction apparatus and an interactive voice response apparatus. In the case in which there is no connectible operator when the call arrives, the time prediction apparatus predicts the time until a connectible operator will become available. The interactive voice response apparatus automatically conveys the predicted time while also maintaining communication and waiting until an operator who can handle the call becomes available, or alternatively, temporarily disconnects the communication and prompts the client to select whether to receive a callback from the operator side.

Japanese Unexamined Patent Application Publication No. 2001-016336 discloses an incoming call distribution system provided with a terminal that sets a call block depending on the communication type, a server that stores incoming calls for each communication type, a server management apparatus that manages the server, and a queue unit that sets a priority ranking for each communication type while also registering incoming calls in a queue. The server management apparatus puts on hold calls of a type for which the call block is set, and distributes calls ranked below the calls put on hold.

Japanese Unexamined Patent Application Publication No. 2008-077337 describes an automatic loan application system in which a management server compares a number of operator IDs of operators who are capable of executing a task indicated by task execution availability information stored in a transaction management database to a number of tasks stored in a task queue, and in the case of determining that the number of operator IDs is less than the number of tasks, searches the task queue on the basis of executable tasks stored in the transaction management database, extracts customer terminal identification information of a customer terminal waiting for a task to be processed while also extracting center terminal identification information of a center terminal capable of executing the task, and establishes communication between the customer terminal and the center terminal such that the task is processed.

Japanese Unexamined Patent Application Publication No. 2016-212812 describes an information processing apparatus including a classification unit that classifies a character recognition target into one of three types, an extraction unit that, in a case in which the character recognition target is classified into a first type by the classification unit, extracts a character recognition result of the character recognition target, a first control unit that, in a case in which the character recognition target is classified into a second type by the classification unit, controls the extraction of a character recognition result of the character recognition target and a manual input of the character recognition target, and a second control unit that, in a case in which the character recognition target is classified into a third type by the classification unit, controls a manual input of the character recognition target by multiple persons.

SUMMARY

In a character recognition process that recognizes a character string recorded on a form, or a data input process that outputs or registers in a database data obtained by having a person input the data while referring to the character string recorded on a form, accuracy is demanded. For this reason, similar data input processes are performed multiple times and the data is compared, the data is confirmed by multiple persons, or the like to ensure accuracy. At this time, if the reference images for referring to characters recorded on forms are managed individually or managed in a decentralized manner without being associated with information about individual data input processes performed by referencing the reference images, in cases in which data input processes performed by referencing the reference images are performed multiple times, managing the progress of the data input processes may be difficult.

Aspects of non-limiting embodiments of the present disclosure relate to making it easier to manage the progress of data input processes compared to the case of not associating reference images with the results of the data input processes.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an acquisition unit that acquires process information associated with a reference image and regarding an input process performed by referencing the reference image, and a process decision unit that decides a content of a next input process to perform by referencing the reference image, on a basis of the process information acquired by the acquisition unit.

BRIEF DESCRIPTION OF THE DRAWINGS

Exemplary embodiments of the present disclosure will be described in detail based on the following figures, wherein:

FIGS. 5A to 5E are diagrams explaining an example of task information according to the first exemplary embodiment, in which FIG. 5A illustrates an initial state, FIG. 5B illustrates a 1st distribution result, FIG. 5C illustrates a 2nd distribution result, FIG. 5D illustrates a 3rd distribution result (in a case in which a comparison result is non-matching), and FIG. 5E illustrates a case in which the comparison result is matching (the case of a matching comparison);

FIG. 6 is a diagram explaining a hardware configuration of the distributor;

FIG. 7 is a diagram explaining an exemplary modification 1-1 of data entry applying the first exemplary embodiment;

FIGS. 10A to 10E are diagrams explaining an example of task information according to the second exemplary embodiment, in which FIG. 10A illustrates an initial state, FIG. 10B illustrates a 1st distribution result, FIG. 10C illustrates a 2nd distribution result, FIG. 10D illustrates a 3rd distribution result (in a case in which a comparison result is non-matching), and FIG. 10E illustrates a case in which the comparison result is matching (the case of a matching comparison);

FIGS. 19A and 19B are diagrams explaining an overview of a distribution server system applying a fourth exemplary embodiment, in which FIG. 19A is a case in which multiple distribution servers are included, and each distribution server is provided with a task buffer and an operator buffer, while FIG. 19B is a case in which multiple distribution servers are included, and the task buffer and the operator buffer are shared; and FIGS. 20A and 20B are diagrams explaining an overview of a distribution server system not applying the fourth exemplary embodiment illustrated for the sake of comparison, in which FIG. 20A is a case in which multiple distribution servers are included, and each distribution server is provided with a task buffer and an operator buffer, while FIG. 20B is a case in which multiple distribution servers are included, and the task buffer and the operator buffer are shared.

DETAILED DESCRIPTION

Herein, a process of inputting data according to an exemplary embodiment of the present disclosure will be described by taking data entry as an example. Data entry refers to taking a handwritten character string (paper information) typically recorded on a piece of paper (a form) or the like, and outputting the character string as text data, or registering the character string in a database. In other words, data entry refers to the work of a series of data input processes that treat a recorded character string (paper information) as input, and ultimately obtain text data as a result. The data input processes are executed by a character recognition process with an optical character recognition (OCR) apparatus, by a person who inputs data (hereinafter designated an "operator") who provides input using a keyboard or voice input using a microphone while referring to a character string recorded on a piece of paper, or the like. The character string recorded on the paper used for data entry may not only be handwritten characters, but may also be information such as a printed character string, or symbols like circles and crosses.

To ensure accuracy in data entry, data input is performed by multiple iterations of data input tasks on a handwritten character string, and the results of the data input (data input results) are compared, or data input is performed while being confirmed by multiple persons. In the data entry described hereinafter, data input is performed by multiple iterations of data input tasks, and the data input results are compared. In other words, if the data input results from multiple iterations of data input tasks match, such as if the data input results from two data input tasks match, for example, it is assumed that correct text data corresponding to the handwritten character string has been obtained. Note that if the data input results do not match, it is inferred that the text data obtained by the data input is incorrect.

Herein, the data input of each of an OCR apparatus and the conversion of a handwritten character string to text data by an operator or the like is designated a data input task.

Hereinafter, exemplary embodiments of the present disclosure will be described in detail and with reference to the attached drawings.

First Exemplary Embodiment

First, a data input task will be described.

Figure 1:
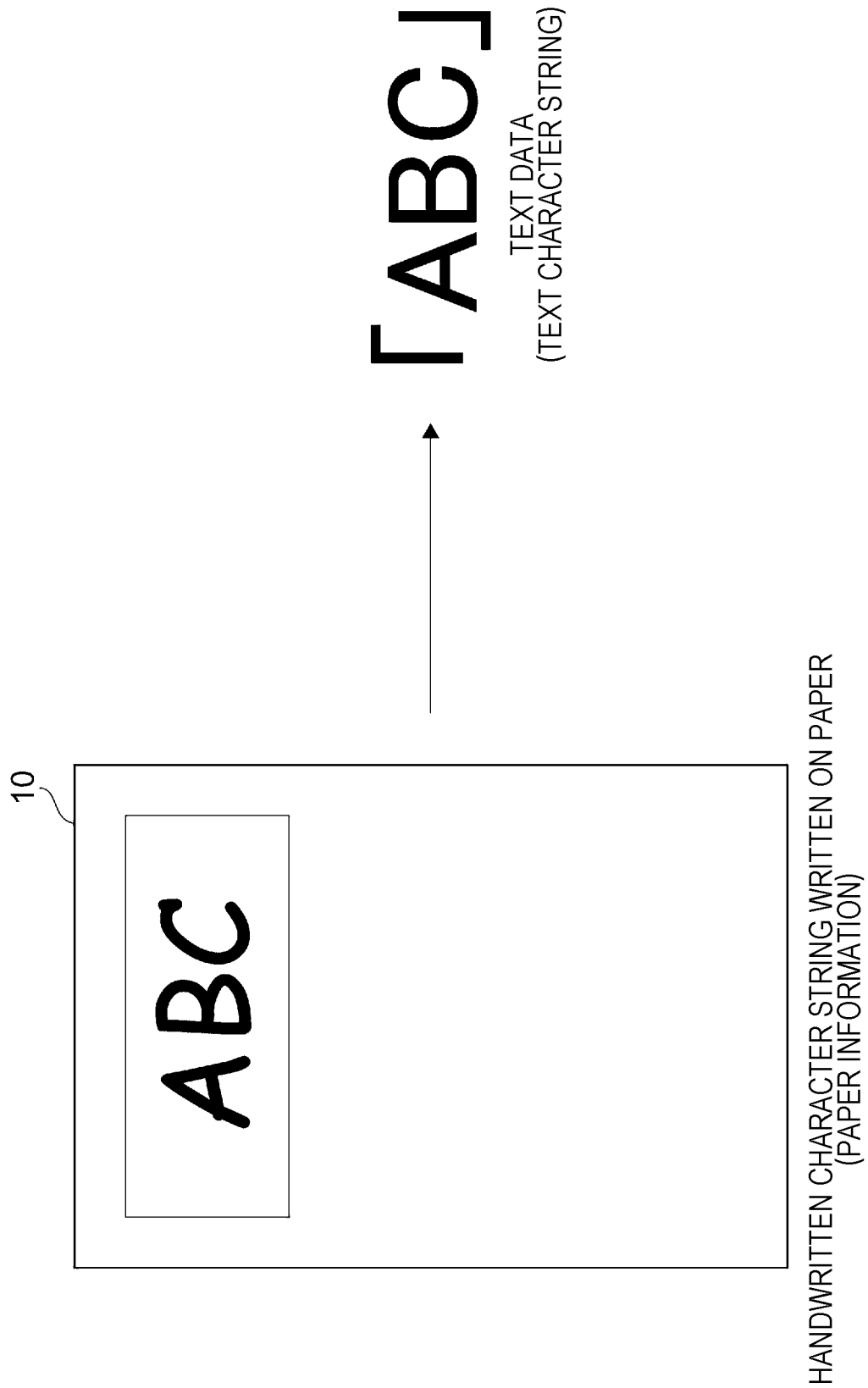
FIG. 1 is a diagram explaining an overview of a data input task.

FIG. 1 is a diagram explaining an overview of a data input task.

As illustrated in FIG. 1, assume that obtaining the text data (text character string) "ABC" from the handwritten character string "ABC" recorded on a piece of paper (form) is the data input task. The handwritten character string being targeted here may be, for example, a name, an address, a place of employment, a telephone number, or the like.

In the case in which the data input tasks is performed by an operator, the operator is able to perform the data input tasks while referring to the paper information. Note that the paper information is the handwritten character string recorded on a piece of paper (form) or the like, and is considered to be image data 10. On the other hand, in the case in which the data input task is performed by a character recognition process by OCR, image data 10 converted to an image from paper information by a scanner, camera, or the like is treated as the target. In other words, in the data input task, it is sufficient to consider the image data 10 as the target of the data input task. Note that the image data 10 does not have to be handwritten characters recorded on a piece of paper (form) or the like. For example, the image data 10 may also be an image including a character string written on an electronic device such as a tablet, and additionally may include stroke information, that is, stroke order and coordinate information about handwritten characters. The image data 10 is one example of a reference image.

(Data Entry According to First Exemplary Embodiment)

Figure 2:
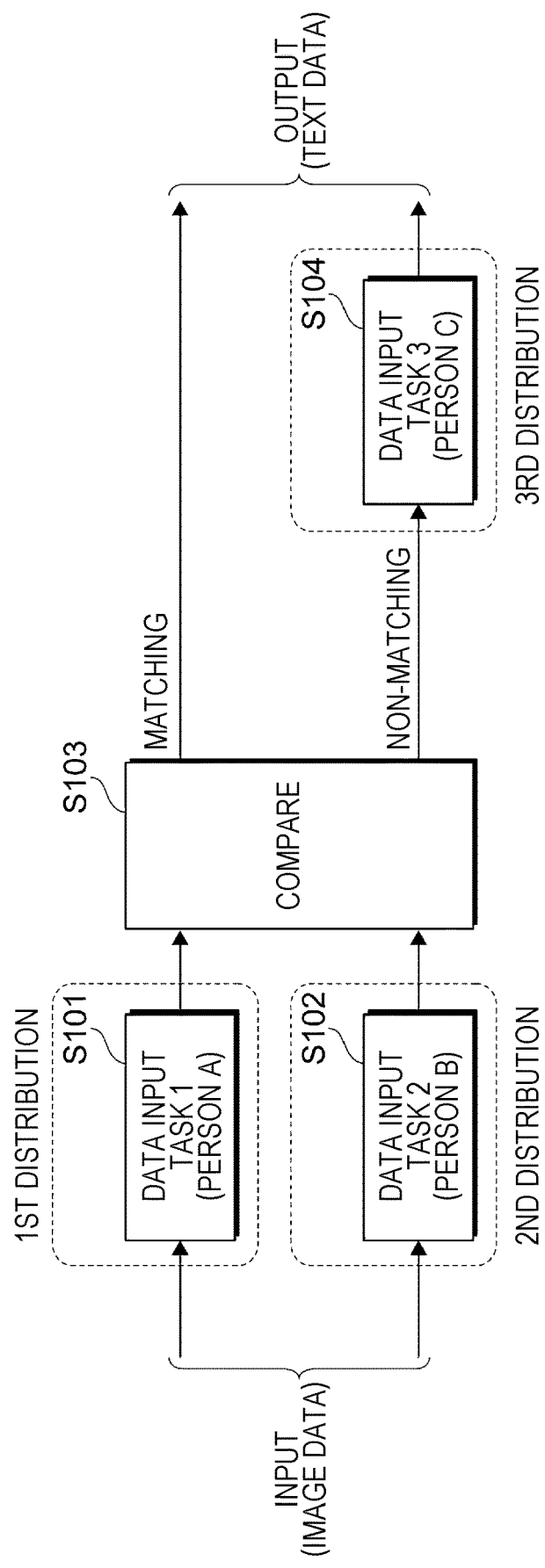
FIG. 2 is a flowchart explaining an example of data entry according to a first exemplary embodiment.

FIG. 2 is a flowchart explaining an example of data entry according to the first exemplary embodiment. Herein, the image data 10 (designated the image data in the description of FIG. 2) is the input, and text data is the output.

Data entry including multiple iterations (herein, three iterations) of data input tasks and comparison of the data input results is performed. The processing logic in this process is to compare the input results of the character string from two data input tasks, and if the two results match, treat the character string of the results as output data, whereas if the two results do not match, perform a new data input task as the next process, and treat the character string of the input result as output data.

The flow of data entry will be described.

With respect to the input (image data), data input (text conversion) by a data input task (data input task 1) is performed (step 101, designated S101 in FIG. 1. The same applies elsewhere.) With respect to the same input (image data), data input (text conversion) by a data input task (data input task 2) is performed (step 102).

Subsequently, the data input result (text data) from the data input task 1 of step 101 and the data input result (text data) from the data input task 2 of step 102 are compared (step 103). Subsequently, in the case in which the result of the comparison of step 103 is that the two data input results (text data) match, the data input result (text data) is output, and data entry ends.

On the other hand, in the case in which the two data input results (text data) do not match, a data input task (data input task 3) is executed with respect to the same input (image data) (step 104). Subsequently, the data input result (text data) obtained by the data input task 3 of step 104 is output, and data entry ends.

As described above, the data input tasks performed in steps 101, 102, and 104 are performed on the same input (image data). However, the data input task of step 104 is performed only in the case of a non-matching result of the comparison of step 103. In other words, the data input task of step 104 is set depending on the progress of data entry. For this reason, data entry demands that the progress be managed to execute data input tasks.

Note that in FIG. 2, the data input result (text data) from the data input task 3 of step 104 is output, but the data input result (text data) from the data input task 3 of step 104 may also be compared to the data input result (text data) from the data input task 1 of step 101 and/or the data input result (text data) from the data input task 2 of step 102, and the matching data input result (text data) may be output. Also, in the case in which matching data input results are not obtained (the non-matching case), an additional data input task may be performed. In this case, the setting of data input tasks in data entry becomes more complicated.

Subsequently, in the case in which the data input task is performed by an operator, if the operator is the same for any of the data input tasks 1 to 3, there is a risk of the same misrecognition (error) occurring due to misreading a handwritten character string or the like. In this case, the meaning of performing multiple iterations of data input tasks is lost. Accordingly, the data input tasks desirably are distributed to be performed by different operators, such as the data input task 1 of step 101 being distributed to an operator A, the data input task 2 of step 102 being distributed to an operator B, and the data input task 3 of step 104 being distributed to an operator C. In this case, management of the progress in data entry becomes even more complicated.

As described above, since multiple data input tasks are performed with respect to data entry that obtains a single output (text data) for a single input (image data), management of the progress is complicated. Particularly, in cases like a data entry center where such data entry is processed in large numbers in parallel, management of the progress of each individual data entry becomes desirable.

Accordingly, in the first exemplary embodiment, for any data input task (for example, the data input tasks 1 to 3 in FIG. 2), a distributor (the distributor 100 in FIG. 3 described later) that specifies an operator and distributes the data input task is provided. In other words, as illustrated in FIG. 2, the distributor 100 distributes the data input tasks 1 to 3 illustrated in steps 101, 102, and 104 to the operators A to C depending on the progress of data entry. Herein, the data input task of step 101 is a first distribution, the data input task 2 of step 102 is a second distribution, and the data input task 3 is a third distribution. In other words, the distributor 100 is designated a distributor because the distributor 100 distributes data input tasks to operators. Additionally, as described later, the distributor 100 distributes the data input tasks 1 to 3 in order. Note that the distributor 100 is one example of an information processing apparatus.

(Distributor 100 Applying First Exemplary Embodiment)

Figure 3:
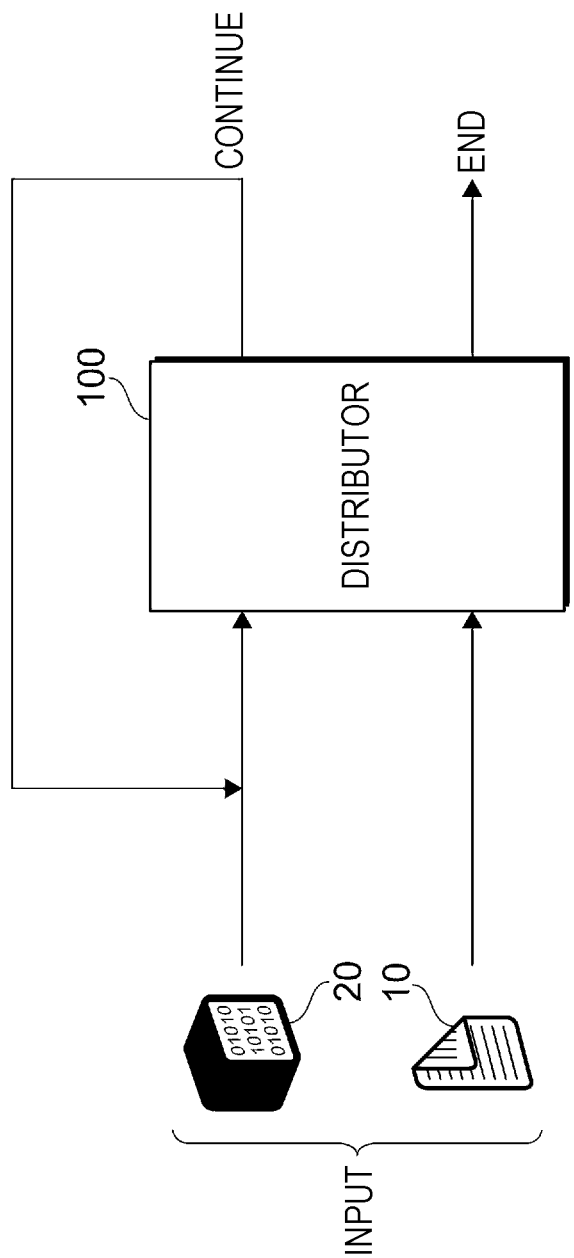
FIG. 3 is a diagram explaining an overview of a distributor applying the first exemplary embodiment.

FIG. 3 is a diagram explaining an overview of the distributor 100 applying the first exemplary embodiment.

In the first exemplary embodiment, the distributor 100 acquires the target on which to perform data entry, namely the image data 10, and task information 20 which is information about a data input task corresponding to (associated with) the image data 10. As described in the fourth exemplary embodiment described later, the image data 10 and the task information 20 corresponding to the image data 10 are assumed to be held (stored) as pairs in a task buffer (the task buffer 700 in FIGS. 19A and 19B) or the like. Note that the task information 20 is one example of process information.

When the distributor 100 acquires the image data 10 and the task information 20, on the basis of the task information 20, the distributor 100 distributes the data input task to an operator, and causes the operator to execute data input. For a data input task at any stage (for example, the data input tasks 1 to 3 illustrated in FIG. 2), the distributor 100 is configured to distribute the data input task to an operator on the basis of the task information 20. Note that the task information 20 will be described later.

Subsequently, when data input is executed by an operator, the distributor 100 creates task information 20 associating the data input result with the image data 10 ("Continue" in FIG. 3). In addition, the distributor 100 acquires the image data 10 and the task information 20 again. Subsequently, the distributor 100 again distributes the data input task to an operator and causes the operator to execute data input, on the basis of the task information 20.

Note that in the case in which data entry ends, or in other words, in the case of not performing the next data input task, the distributor 100 ends the flow ("End" in FIG. 3). Note that the end of data entry refers to the end of text conversion with respect to an obtained handwritten character string. The text data at the time of ending is adopted and saved in a predetermined database. In addition, the image data 10 and the task information 20 related to the data input task may be saved in an end buffer or the like, or may be discarded.

In this way, the distributor 100 is configured to distribute all data input tasks (the data input tasks 1 to 3 in FIG. 2) in data entry to operators. Moreover, the distributor 100 does not manage which data input task it is. In other words, the distributor 100 distributes a data input task to an operator on the basis of the task information 20 acquired together with the image data 10. Consequently, data input tasks corresponding to a single data entry do not have to be distributed sequentially to the distributor 100. In other words, after distributing a data input task corresponding to a single data entry, a data input task corresponding to another data entry may be distributed.

Next, the distributor 100 will be described in detail.

Figure 4:
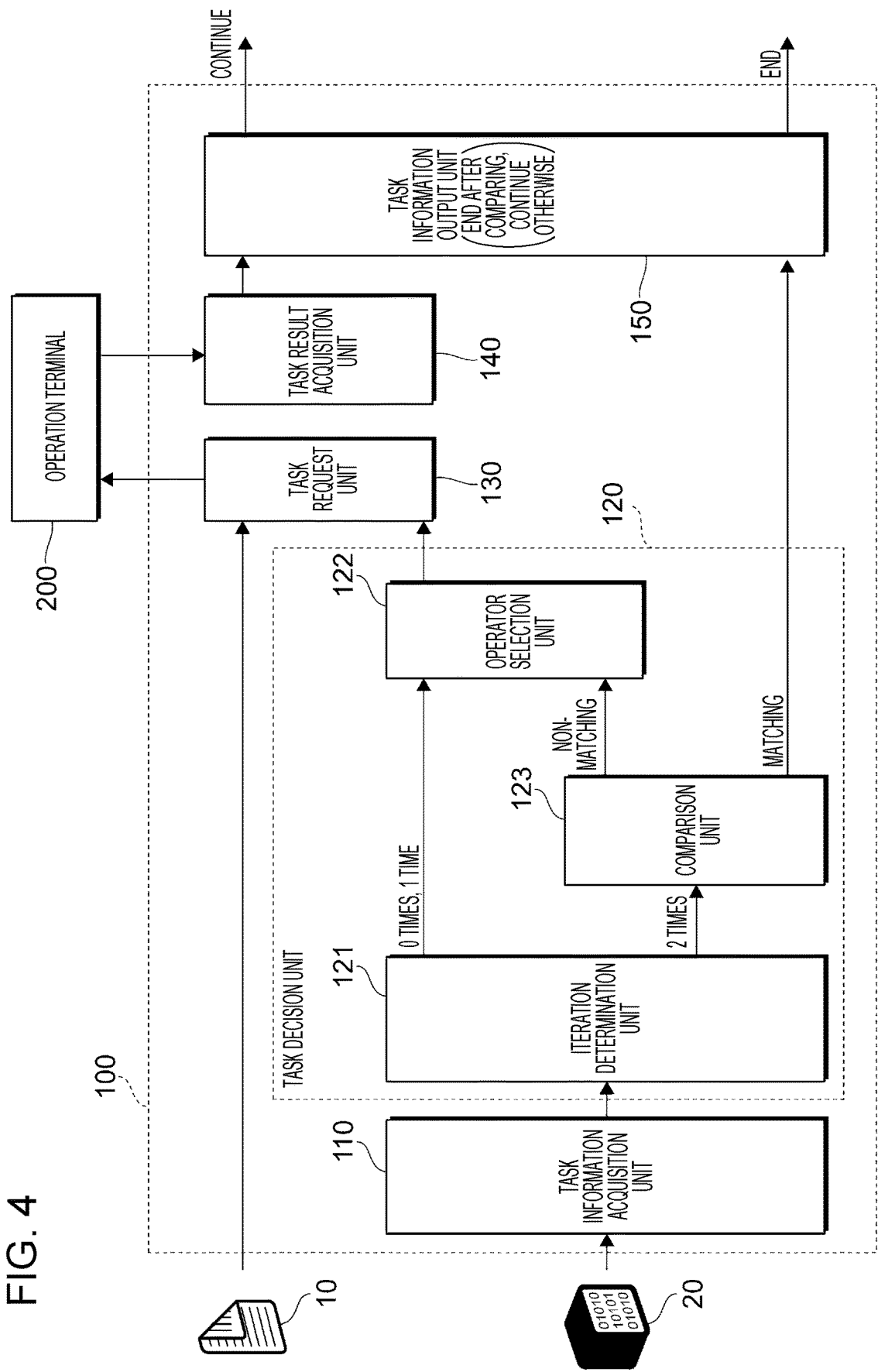
FIG. 4 is a diagram explaining an example of a functional configuration of a distributor applying the first exemplary embodiment.

FIG. 4 is a diagram explaining an example of a functional configuration of the distributor 100 applying the first exemplary embodiment (applying the data entry illustrated in FIG. 2).

The distributor 100 is provided with a task information acquisition unit 110 that acquires the task information 20, a task decision unit 120 that decides the content of a data input task to perform next on the basis of the task information 20, a task request unit 130 that requests an operation terminal 200 of an operator to perform a data input task, a task result acquisition unit 140 that acquires a result of data input (data input result) by the operator, and a task information output unit 150 that creates and outputs task information 20 associating the data input result with the image data 10.

Herein, the task information acquisition unit 110 is one example of an acquisition unit, the task decision unit 120 is one example of a process decision unit, the task request unit 130 is one example of a process request unit, the task result acquisition unit 140 is one example of a result acquisition unit, the task information output unit 150 is one example of a process information output unit and a processing unit, and the operation terminal 200 is one example of an input unit.

In the first exemplary embodiment, as an example, the task decision unit 120 is provided with processing logic that decides the content of the data input task (input process) to perform next on the basis of the task information 20. The task decision unit 120 is configured to decide the content of the data input task to perform next according to the process contents and process results of data input tasks performed thus far. Herein, as one example of processing logic that decides the content of a data input task, assume that control depending on the number of iterations of the data input task is executed. For this reason, the task decision unit 120 is provided with an iteration determination unit 121 that determines the number of already-performed data input tasks, an operator selection unit 122 that selects an operator to execute a data input task, and a comparison unit 123 that compares data input results.

Next, the connection relationships among the units provided in the distributor 100 will be described.

The distributor 100 distributes data input tasks while proceeding to each unit described above.

The task information acquisition unit 110 is connected to the iteration determination unit 121 included in the task decision unit 120. The iteration determination unit 121 is connected to the operator selection unit 122 and the comparison unit 123. The flow branches to the operator selection unit 122 or the comparison unit 123 depending on the number of already-performed data input tasks determined by the iteration determination unit 121.

The comparison unit 123 is connected to the operator selection unit 122 and the task information output unit 150. The flow branches to the operator selection unit 122 or the task information output unit 150 depending on the result of the comparison by the comparison unit 123.

The task request unit 130 acquires the image data 10 from among the image data 10 and the task information 20 acquired by the distributor 100. Additionally, the task request unit 130 is connected to the operator selection unit 122 and the operation terminal 200 which is operated by an operator and which is provided externally to the distributor 100. Herein, a single operation terminal 200 is illustrated, but assume that the task request unit 130 is connected to multiple operation terminals 200. Subsequently, the task request unit 130 requests the operation terminal 200 selected by the operator selection unit 122 to perform a data input task.

The task result acquisition unit 140 is connected to the operation terminal 200 which is operated by an operator and which is provided externally to the distributor 100, and to the task information output unit 150. Herein, a single operation terminal 200 is likewise illustrated, but assume that the task result acquisition unit 140 is connected to multiple operation terminals 200. The task result acquisition unit 140 acquires a result of data input (data input result) from the operation terminal 200 that the task request unit 130 requested to perform the data input task.

Next, the operations of the distributor 100 will be described.

The task information acquisition unit 110 acquires the task information 20 from among the image data 10 and the task information 20 acquired by the distributor 100. On the other hand, the task request unit 130 acquires the image data 10 from among the image data 10 and the task information 20 acquired by the distributor 100.

The iteration determination unit 121 connected to the task information acquisition unit 110 determines the number of already-performed data input tasks on the basis of the task information 20 acquired by the task information acquisition unit 110. In the case in which the iteration determination unit 121 determines that the number of already-performed data input tasks is less than a predetermined number (herein, since the predetermined number of times is 2 times, in the case of 0 times or 1 time), the flow branches to the operator selection unit 122.

Subsequently, the operator selection unit 122 selects an operator to request to perform the next data input task (corresponding to the data input tasks 1 and 2 in steps 101 and 102 of FIG. 2). Note that the operator selection unit 122 selects an operator who is not executing a data input task. Note also that an operator requested to perform a fewer number of data input tasks may also be selected. Also, as described above, an operator different from the operator requested to perform an already-performed data input task may also be selected. It is sufficient for the above conditions to be stipulated in advance in the processing logic of the task decision unit 120.

On the other hand, in the case in which the number of already-performed data input tasks is a predetermined number of multiple times (herein, in the case of 2 times), the iteration determination unit 121 branches to the comparison unit 123.

The comparison unit 123 compares the two already-acquired data input results (corresponding to the comparison in step 103 of FIG. 2), and in the case of determining that the data input results are non-matching, the operator selection unit 122 selects an operator to execute the next data input task (corresponding to the data input task 3 in step 104 of FIG. 2).

In the case in which the comparison unit 123 compares the two already-acquired data input results (corresponding to the comparison in step 103 of FIG. 2), and determines that the data input results are matching, the task information output unit 150 outputs task information 20 including an indication of matching in the task information 20 associated with the image data 10. If the two already-acquired data input results match, the data input result is adopted, and the data entry ends. In other words, this corresponds to "End" in FIG. 3. Thus, the task information output unit 150 additionally may include an indication that data entry has ended in the task information 20.

When the operator selection unit 122 selects an operator to execute the next data input task, the task request unit 130 transmits the acquired image data 10 to the operation terminal 200 of the selected operator, and requests the operation terminal 200 to perform the data input task.

Note that, as an example, the task request unit 130 forms an image in which the image data 10 and an input image provided with an input field in correspondence with the portion to convert to text in the image data 10 are arranged side-by-side, and transmits the formed image to a display of the operation terminal 200 operated by the operator selected by the operator selection unit 122. The operator refers to the image data 10 in the image on the display of the operation terminal 200, and inputs text data with the keyboard or the like in the input field of the input image.

The task result acquisition unit 140 acquires the data input result (text data) with respect to the data input task requested by the task request unit 130 from the operation terminal 200 of the selected operator. Subsequently, the task information output unit 150 updates and outputs task information 20 associating the data input result with the image data 10. The task information output unit 150 may also include (the name of) the operator who performed the data input task together with the data input result in the task information 20. With this arrangement, the operator selection unit 122 selects a different operator from the operators requested to perform previous data input tasks as the operator to perform the next data input task.

At this time, in the case in which a non-matching determination is made by the comparison unit 123, data entry ends. In other words, in the case in which a data input task (the data input task 3 in FIG. 2) is executed after a comparison is performed, data entry ends (data entry ends after comparison). Additionally, the text data obtained by the data input task after performing a comparison is adopted. In other words, this corresponds to "End" in FIG. 3. At this time, the task information output unit 150 may be configured to additionally include an indication that data entry has ended in the task information 20.

On the other hand, in the case in which 0 times or 1 time is determined by the iteration determination unit 121, and a comparison has not been performed, data entry continues without ending. In other words, this corresponds to "Continue" in FIG. 3.

Herein, the task information output unit 150 may also output the task information 20 to a task buffer provided externally to the distributor 100 described in the fourth exemplary embodiment described later, and the distributor 100 may hold the image data 10 and the task information 20 in association with each other.

Note that data input results acquired by the task result acquisition unit 140 may also be treated as the task information 20. In other words, the task information output unit 150 associates the task information 20 with the image data 10. Subsequently, every time new task information 20 (a data input result) is acquired from the task result acquisition unit 140, the task information output unit 150 associates the new task information 20 (data input result) with the image data 10.

Additionally, the task information output unit 150 may associate task information 20 (a data input result) acquired from the task result acquisition unit 140 with the image data 10 in a task buffer.

As described above, the data entry illustrated in FIG. 2 may be performed by the distributor 100 illustrated in FIG. 4. Additionally, as illustrated in FIG. 3, when the distributor 100 illustrated in FIG. 4 acquires the image data 10 and the task information 20 as input, the content of the next data input task (input process) is decided on the basis of the task information 20. Subsequently, by repeatedly distributing and executing data input tasks by the distributor 100, data entry ends.

Note that the content of the next data input task (input process) refers to whether or not to perform the data input task, and may include the selection of an operator to execute the data input task.

(Task Information 20 According to First Exemplary Embodiment)

Next, the task information 20 according to the first exemplary embodiment will be described.

FIGS. 5A to 5E are diagrams explaining an example of the task information 20 according to the first exemplary embodiment, in which FIG. 5A illustrates an initial state, FIG. 5B illustrates a 1st distribution result, FIG. 5C illustrates a 2nd distribution result, FIG. 5D illustrates a 3rd distribution result (in the case in which the comparison result is non-matching), and FIG. 5E illustrates the case in which the comparison result is matching (the case of a matching comparison).

As illustrated in FIG. 5A, in the initial state, that is, the initial state in which a data input task has not been distributed even once, the task information 20 includes an identification symbol (data entry ID) xx that identifies the data entry, and a file name (image file name) yy of the image data 10 linked to (associated with) the task information 20 as information. With this arrangement, the task information 20 is associated with the image data 10.

As illustrated in FIG. 5B, the task information 20 of the 1st distribution result includes the above information, as well as the 1st data input result "ABC" and the 1st data input method (herein, (the name of) the operator who executed the data input) person A as information.

As illustrated in FIG. 5C, the task information 20 of the 2nd distribution result includes all of the above information, as well as the 2nd data input result "BCD" and the 2nd data input method (herein, (the name of) the operator who executed the data input) person B as information.

As illustrated in FIG. 5D, in the case in which the comparison result is non-matching, the 3rd distribution result becomes the task information 20. Additionally, in addition to all of the above information, the comparison result (herein, "non-matching"), the 3rd data input result "CDF", and the 3rd data input method (herein, (the name of) the operator who executed the data input) person C are included as information. In addition, a notation indicating that data entry has ended (herein, "End") is included as information. Note that the notation indicating that data entry has ended (herein, "End") does not have to be included. The same applies to the other cases.

Note that, as illustrated in FIG. 5E, in the case in which the data input result by the person B in FIG. 5C is "ABC", the result of the comparison becomes matching. In this case, the task information 20 includes the comparison result (herein, "matching") and a notation indicating that data entry has ended (herein, "End") as information.

In other words, the results of distributing and executing data input tasks (the data input results and the data input methods (operator names)) are added to the task information 20 associated with the image data 10. In other words, the task information 20 holds a history related to executed data input tasks. Additionally, a single data entry is processed with a single set of task information 20. Thus, the iteration determination unit 121 in the distributor 100 illustrated in FIG. 4 determines the number of already-performed data input tasks on the basis of the task information 20. Additionally, with this arrangement, the content of the data input task to perform next is decided. In other words, in the case in which the number of already-performed data input tasks is less (0 time or 1 time) than a predetermined number of multiple times (in FIG. 4, 2 times), an operator is selected and a data input task is distributed. On the other hand, in the case in which the number of already-performed data input tasks is the predetermined number of multiple times (herein, 2 times), the data input results from the already-performed data input tasks are compared by the comparison unit 123, and if the data input results are matching, data entry ends, whereas if the data input results are non-matching, an operator is selected and a data input task is distributed.

As described above, if the task information 20 holds information (operator names) related to the operators to whom data input tasks have been distributed thus far, on the basis of the task information 20, the operator selection unit 122 is able to select an operator different from the operators to whom data input tasks have been distributed thus far as the operator to whom to distribute the next data input task.

Additionally, the distributor 100 does not hold information related to the progress of individual data entries. The distributor 100 acquires the image data 10 related to a data entry and the task information 20 corresponding to the image data 10, and ascertains the progress of the data entry for the first time. In other words, the distributor 100 acquires the image data 10 and the task information 20 on the basis of the distribution-related processing logic held in the distributor 100, and distributes the next data input task on the basis of the task information 20.

Thus, the distributor 100 applying the first exemplary embodiment is able to receive and process a mixture of distributions of multiple iterations of data input tasks related to a certain data entry, and distributions of at least multiple iterations of data input tasks related to another data entry.

In this way, in the distributor 100 applying the first exemplary embodiment, the management of the progress related to the distribution of data input tasks for data entry becomes easy.

(Hardware Configuration of Distributor 100)

FIG. 6 is a diagram explaining a hardware configuration of the distributor 100.

The distributor 100 is provided with a CPU 301, ROM 302, RAM 303, an HDD 304, a communication input/output interface (communication IF) 305, an input/output interface (input/output IF) 306, a display 307 connected to the input/output IF 306, an input device 308 connected to the input/output IF 306, and a bus 309.

The ROM 302 is non-volatile memory that stores stored (written) data even when there is no supply of power. The ROM 302 is EPROM, EEPROM, flash memory, or the like, for example. The ROM 302 stores application software (programs) for causing the hardware to operate as the distributor 100, and data such as constants used by the programs, initial values of variables, and the like.

The RAM 303 is volatile memory in which stored data is lost when the supply of power is cut off. The RAM 303 is faster than the ROM 302 at reading and writing data. The RAM 303 is DRAM, for example. Programs and data stored in the ROM 302 are read out and loaded into the RAM 303 in an executable state, while in addition, the RAM 303 is used as a work area that stores data for causing the distributor 100 to operate.

The HDD 304 is rewritable non-volatile memory that holds stored (written) data even when there is no supply of power, and stores large amounts of data. Similarly to the ROM 302, the HDD 304 may store application software (programs) for causing the hardware to operate as the distributor 100, and data such as constants used by the programs, initial values of variables, and the like.

The bus 309 is connected to the CPU 301, the ROM 302, the RAM 303, the HDD 304, the communication IF 305, and the input/output IF 306, enabling the input and output of programs and data under control by the CPU 301.

The communication IF 305 is an interface that acquires the image data 10 and the task information 20, and is an interface with the operation terminal 200. Note that in FIG. 4, the image data 10 and the task information 20 are described as being acquired from outside of the distributor 100, but the image data 10 and the task information 20 may also be held in the RAM 303, the HDD 304, or the like included in the distributor 100.

The input/output IF 306 is connected to the display 307 and the input device 308. The display 307 is an LCD or the like capable of presenting images visually. The input device 308 is a device for issuing instructions to the CPU 301, and is a keyboard, a touch panel, one or more switches, or the like. In the distributor 100, the display 307 and/or the input device 308 do not have to be provided.

When the CPU 301 is powered on, a program and data stored in the ROM 302 (or the HDD 304) are read out and loaded into the RAM 303 in an executable state. Subsequently, the program is executed. In association with the execution of the program, data is exchanged among the HDD 304, the communication IF 305, and the input/output IF 306.

In the above description, the ROM 302, the RAM 303, and the HDD 304 are provided, but some of the ROM 302, the RAM 303, and the HDD 304 may also be configured as rewritable non-volatile memory. It is sufficient to use flash memory or the like as the rewritable non-volatile memory. Additionally, the ROM 302 and the RAM 303 may also be integrated with the CPU 301. In this case, the ROM 302 and the RAM 303 may also be configured as rewritable non-volatile memory. It is sufficient to use flash memory or the like as the rewritable non-volatile memory.

In the above, the distributor 100 is described as operating as a distributor by application software (a program) stored in the ROM 302 or the HDD 304. In this case, each component of the distributor 100 described above is realized by application software (a program) loaded into the RAM 303 in an executable state, and the operation of the distributor 100 is executed.

On the other hand, the program stored in the ROM 302 or the HDD 304 and loaded into RAM in an executable state may also be a program that executes an input series of commands. The program that executes a series of commands is an interpreter, for example. In this case, the series of commands that functions as the distributor 100 is held in the task information 20. By loading and executing the task information 20, the program that executes the series of commands causes the above hardware to function as the distributor 100. At this time, when the task information output unit 150 creates the task information 20 associating the data input result with the image data 10, it is sufficient to rewrite (change) the series of commands that functions as the distributor 100. For example, in the iteration determination unit 121 and the comparison unit 123, it is sufficient to set the command to execute next on the basis of the data input result.

Note that the operation terminal 200 operated by an operator also has a hardware configuration similar to the hardware configuration illustrated in FIG. 6. In the operation terminal 200, a screen enabling the operator to perform data input is displayed on the display 307, and data input is executed by the input device 308, which is a keyboard or the like.

Additionally, the communication IF 305 of the distributor 100 and the communication IF 305 of the operation terminal 200 may be connected by a local area network (LAN) or the like, or may be connected by a WAN using a public network or the Internet.

(Exemplary Modification 1-1)

In the data entry illustrated in FIG. 3, in the "Continue" case, a single distributor 100 executes data input tasks by repeatedly acquiring the image data 10 and the task information 20.

FIG. 7 is a diagram explaining an exemplary modification 1-1 of data entry applying the first exemplary embodiment.

Herein, three distributors 100A, 100B, and 100C are connected in series. Additionally, in the "Continue" case, the task information 20 created by the task information output unit 150 in the previous distributor upstream is output together with the image data 10 to the next distributor downstream.

With this arrangement, the first distribution, second distribution, and third distribution of a single data entry are executed sequentially. In other words, when described in terms of the distributor 100 illustrated in FIG. 4, the distributor 100A corresponds to the distributor 100 in the case in which the number of distributions of data input tasks is 0 times. In this case, since the flow is in a state in which a first data input task has been distributed by the distributor 100A (first distribution), the flow proceeds to "Continue".

Next, the distributor 100B corresponds to the distributor 100 in the case in which the number of distributions of data input tasks is 1 time. In this case, since the flow is in a state in which a second data input task has been distributed by the distributor 100B (second distribution), the flow proceeds to "Continue".

Subsequently, the distributor 100C corresponds to the distributor 100 in the case of comparing the already-acquired data input results from the distributions of the above two data input tasks. In this case, in the matching case, the flow ends, whereas in the non-matching case, the flow enters a state in which a third data input task is distributed (third distribution) and ends.

Note that the distributors 100A, 100B, and 100C may also have a configuration similar to the distributor 100 illustrated in FIG. 4. Additionally, the distributors 100A, 100B, and 100C may also be configured differently from each other. For example, the distributors 100A and 100B do not have to be provided with the iteration determination unit 121 and the comparison unit 123 of the distributor 100. Also, the distributor 100C does not have to be provided with the iteration determination unit 121 of the distributor 100.

In this way, by sequentially transferring the task information 20 to the distributors 100A, 100B, and 100C, a single data entry is executed. Note that since each of the distributors 100A, 100B, and 100C operates on the basis of the task information 20, the distributors 100A, 100B, and 100C operate asynchronously.

The above describes the data entry described in FIG. 4 as an example, but in the case of using more than three data input tasks, it is sufficient to dispose more than three distributors in series.

Second Exemplary Embodiment

In the data entry in the first exemplary embodiment, as illustrated in FIG. 2, three data input tasks (data input tasks 1, 2, 3) are distributed to operators (person A, person B, person C).

In the data entry in the second exemplary embodiment, one of the data input tasks, namely the data input task 1, is executed by OCR (an OCR process).

(Data Entry According to Second Exemplary Embodiment)

Figure 8:
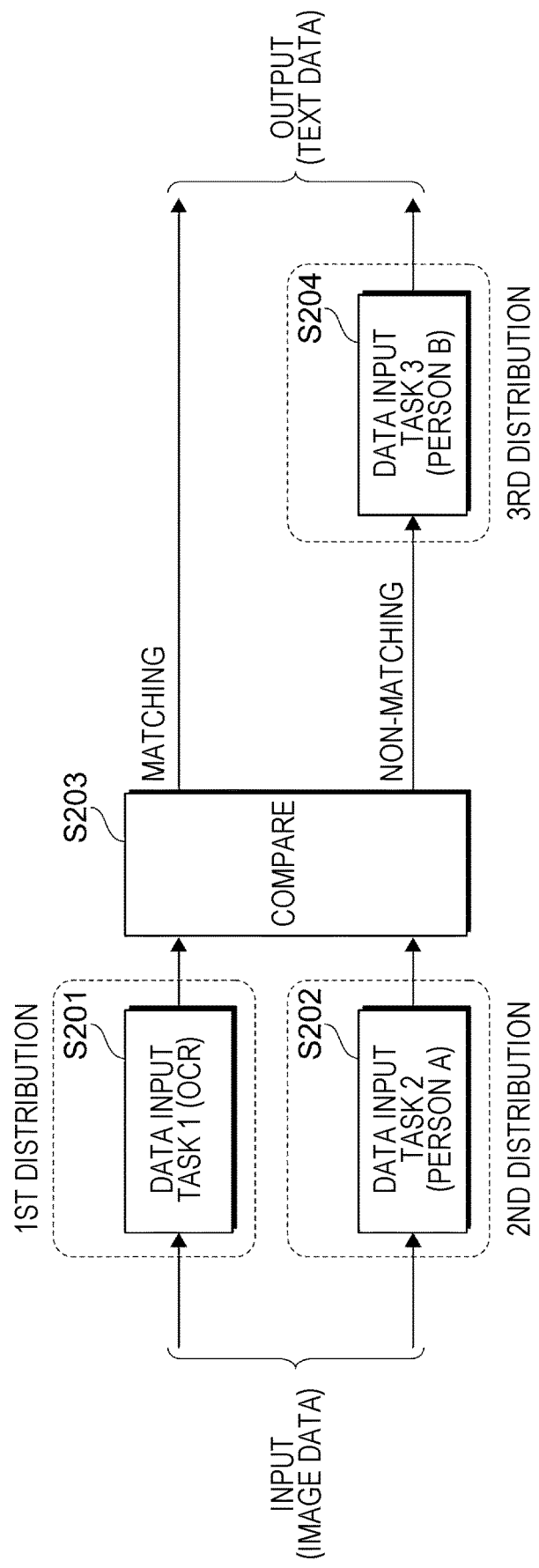
FIG. 8 is a flowchart explaining an example of data entry according to a second exemplary embodiment.

FIG. 8 is a flowchart explaining an example of data entry according to the second exemplary embodiment. Likewise in this case, the image data 10 (designated the image data in the description of FIG. 8) is the input, and text data is the output.

Data entry including multiple iterations (three iterations) of data input tasks and one comparison is performed.

The flow of data entry will be described.

A data input task (data input task 1) is distributed to the OCR and a character recognition process is performed with respect to the input (image data) (step 201). A data input task (data input task 2) is distributed to the operator A and executed with respect to the same input (image data) (step 202).

Subsequently, the data input result (text data) from the data input task 1 of step 201 and the data input result (text data) from the data input task 2 of step 202 are compared (step 203). Subsequently, in the case in which the result of the comparison in step 203 is that the two data input results (text data) match, the data input result (text data) is output, and data entry ends.

On the other hand, in the case in the result of the comparison in step 203 is that the two data input results (text data) do not match, a data input task (data input task 3) is distributed to the operator B and executed with respect to the same input (image data) (step 204). Subsequently, the data input result (text data) obtained in step 204 is output, and data entry ends.

Note that, as described in the first exemplary embodiment, the data input result (text data) from the data input task 3 of step 204 may also be compared to the data input result (text data) from the data input task 1 of step 201 and/or the data input result (text data) from the data input task 2 of step 202, and the matching data input result (text data) may be output. Also, in the non-matching case, an additional data input task may be distributed and executed.

(Distributor 400 Applying Second Exemplary Embodiment)

Next, a distributor 400 applying the second exemplary embodiment will be described.

Figure 9:
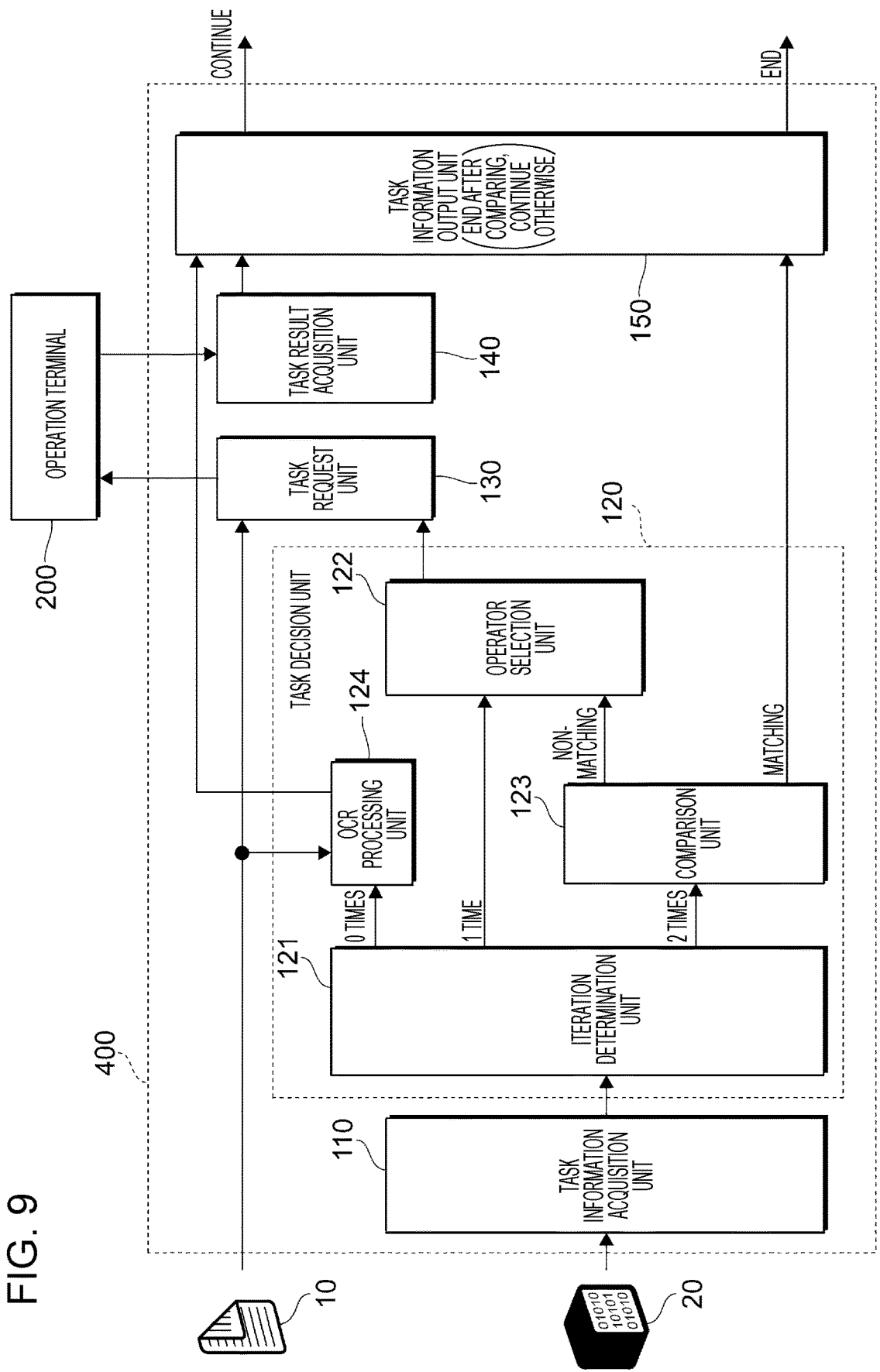
FIG. 9 is a diagram explaining an example of a functional configuration of a distributor applying the second exemplary embodiment.

FIG. 9 is a diagram explaining an example of a functional configuration of the distributor 400 applying the second exemplary embodiment.

Note that the overview of data entry in the distributor 400 is the same as the distributor 100 illustrated in FIG. 3. In other words, it is sufficient to substitute the distributor 400 for the distributor 100 in FIG. 3. Consequently, a description will be omitted.

In the second exemplary embodiment, as an example, the task decision unit 120 is provided with processing logic that decides the content of the data input task (input process) to perform next on the basis of the task information 20. Herein, in the case in which no data input task has been distributed yet (the number of distributions of data input tasks is 0 times), the task decision unit 120 is configured to execute character recognition by an OCR process.

Hereinafter, the distributor 400 will be described in comparison with the distributor 100. Thus, portions which are the same as the distributor 100 will be denoted with the same signs, and description thereof will be reduced or omitted.

In the distributor 400, an OCR processing unit 124 is provided in the task decision unit 120. The rest of the configuration of the distributor 400 is the same as the distributor 100.

The OCR processing unit 124 recognizes (performs character recognition on) a character string included in the image data 10, and converts the character string to text data.

Next, connection relationships in the distributor 400 will be described.

The OCR processing unit 124 is connected to the iteration determination unit 121 and the task information output unit 150. The flow branches to the OCR processing unit 124 depending on the number of already-performed data input tasks determined by the iteration determination unit 121. The OCR processing unit 124 acquires the image data 10 from among the image data 10 and the task information 20 acquired by the distributor 400.

Next, the operation of the distributor 400 will be described with focus on the portions which are different from the distributor 100.

The task information acquisition unit 110 acquires the task information 20 from among the image data 10 and the task information 20 acquired by the distributor 400. The iteration determination unit 121 determines the number of already-performed data input tasks on the basis of the task information 20 acquired by the task information acquisition unit 110.

Subsequently, in the case in which the iteration determination unit 121 determines that the number of already-performed data input tasks is 0 times, the flow branches to the OCR processing unit 124. The OCR processing unit 124 sends, to the task information output unit 150, the result (data input result) of performing the character recognition process on a handwritten character string included in the image data 10 and converting the character string to text data. Subsequently, the task information output unit 150 creates task information 20 associating the data input result produced by the OCR processing unit 124 with the image data 10, and outputs the created task information to the task information 20. At this time, the task information 20 may also include the data input method (herein, OCR). Note that the data input task by the OCR process (character recognition process) is counted as one iteration.

In the case in which the number of data input tasks determined by the iteration determination unit 121 is less (1 time in FIG. 9) than a predetermined number of multiple times (in FIG. 9, 2 times), the operator selection unit 122 selects an operator to which to distribute the data input task to perform next. Additionally, in the case in which the number of data input tasks determined by the iteration determination unit 121 (2 times in FIG. 9) is the predetermined number of multiple times (in FIG. 9, 2 times), the data input result from the OCR process and the data input result from the operator are compared by the comparison unit 123. After that, the operation is similar to the first exemplary embodiment, and therefore a description is omitted.

In the first exemplary embodiment, a data input task is distributed to an operator even in the case of determining that no data input task has been distributed (the number of already-performed data input tasks is 0 times) according to the task information 20, but in the second exemplary embodiment, a character recognition process is executed by the OCR processing unit 124.

(Task Information 20 According to Second Exemplary Embodiment)

Next, the task information 20 according to the second exemplary embodiment will be described.

FIGS. 10A to 10E are diagrams explaining an example of the task information 20 according to the second exemplary embodiment, in which FIG. 10A illustrates an initial state, FIG. 10B illustrates a 1st distribution result, FIG. 10C illustrates a 2nd distribution result, FIG. 10D illustrates a 3rd distribution result (in the case in which the comparison result is non-matching), and FIG. 10E illustrates the case in which the comparison result is matching (the case of a matching comparison).

As illustrated in FIG. 10A, in the initial state, that is, the initial state in which a data input task has not been distributed even once, the task information 20 includes an identification symbol (data entry ID) xx that identifies the data entry, and a file name (image file name) yy of the image data 10 corresponding to (associated with) the task information 20 as information.

As illustrated in FIG. 10B, the task information 20 of the 1st distribution result by the OCR process includes the above information, as well as the 1st data input result "ABC" by the OCR process and the 1st data input method (herein, the OCR executed on the data input) as information. Note that the task information 20 illustrated in FIG. 10B includes the certainty of the recognition by the OCR process and position information about the position of the recognized characters. Additionally, the second and lower recognition candidates obtained by the OCR process or the like may also be included.

Herein, the certainty refers to an index that indicates the reliability (accuracy) of the character recognition by the OCR process. For example, the certainty is set according to the number of candidate characters or the like with respect to the read characters. Herein, the certainty is 0.9. Also, the position information is a character position (position of a character in the horizontal direction) XYHW and a character string position (position of a character in the vertical direction) XYHW. Note that the position information does not have to be included.

As illustrated in FIG. 10C, the task information 20 of the 2nd distribution result includes all of the above information, as well as the 2nd data input result "BCD" and the 2nd data input method (herein, the operator A who executed the data input) as information.

As illustrated in FIG. 10D, in the case in which the comparison result is non-matching, the 3rd distribution result becomes the task information 20. Additionally, in addition to all of the above information, the comparison result (herein, "non-matching"), the 3rd data input result "CDF", and the 3rd data input method (herein, the operator B who executed the data input) are included as information. Furthermore, a notation indicating that data entry has ended (herein, "End") is included as information.

Note that, as illustrated in FIG. 10E, in the case in which the data input result by the person A in FIG. 10C is "ABC", the result of the comparison becomes matching. In this case, the task information 20 includes the comparison result (herein, "matching") and a notation indicating that data entry has ended (herein, "End") as information.

In other words, the results of distributing and executing data input tasks (the data input results and the data input methods) are added to the task information 20 in a time series. In other words, the task information 20 holds a history related to executed data input tasks. Thus, even in the case in which the distributor 400 illustrated in FIG. 9 includes the OCR processing unit 124, on the basis of the task information 20, the task decision unit 120 determines the number of already-performed data input tasks, and decides the content of the data input task (input process) to perform next.

Note that in FIG. 9, the OCR processing unit 124 is taken to be provided inside the distributor 400, but may also be provided externally to the distributor 400 as an OCR processing apparatus. In this case, it is sufficient to take a configuration in which the distributor 400 transmits the image data 10 to the externally provided OCR processing apparatus, and acquires a recognition result (data input result) from the OCR processing apparatus. Note that since the distributor 400 acquires and transmits the image data 10 to the OCR processing apparatus, the OCR processing apparatus is not required to be provided with a scanner or camera.

Third Exemplary Embodiment

In the data entry in the third exemplary embodiment, data input tasks are distributed on the basis of the certainty of the OCR process. Herein, the certainty is treated as high in the case in which the certainty exceeds a predetermined threshold value T (T<certainty). Also, the certainty is treated as medium in the case in which the certainty is less than or equal to the threshold value T, and also exceeds a predetermined threshold value S (S<certainty≤T). Additionally, the certainty is treated as low in the case in which the certainty is less than or equal to the threshold value S (certainty≤S). Note that T<certainty may also be taken to be T≤certainty, S<certainty≤T may also be taken to be S≤certainty<T, and certainty≤S may also be taken to be certainty<S. The same applies to the other cases.

Figure 11:
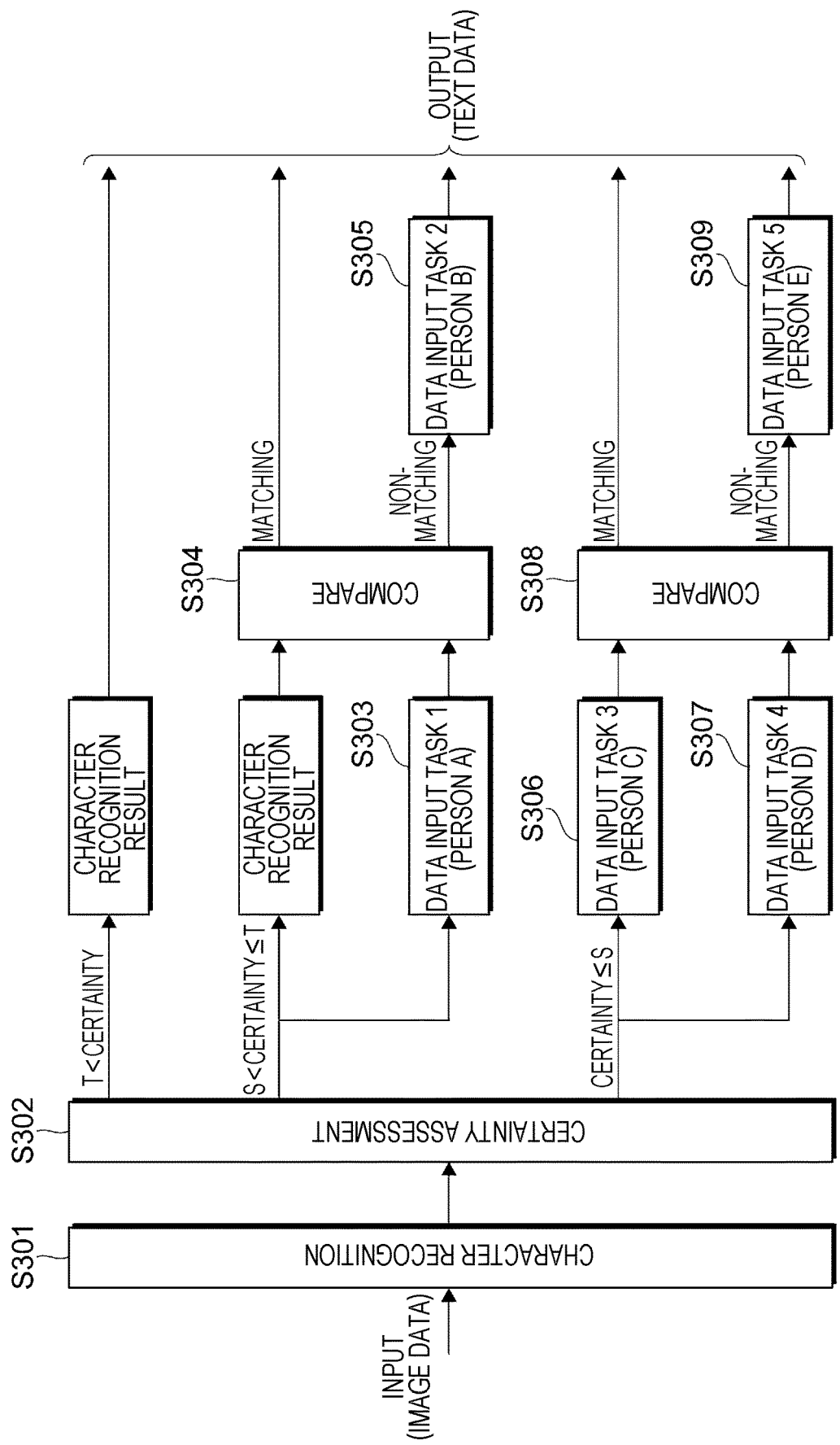
FIG. 11 is a flowchart explaining an example of data entry applying a third exemplary embodiment.

FIG. 11 is a flowchart explaining an example of data entry applying the third exemplary embodiment. Likewise in this case, the image data 10 (designated the image data in the description of FIG. 11) is the input, and text data is the output.

The data entry includes five data input tasks and two comparisons.

The input image data is subjected to character recognition (data input) by an OCR process (step 301). Subsequently, the certainty of the character recognition by the OCR process is determined (step 302).

In step 302, in the case of determining that the certainty is high (T<certainty), the character recognition (data input) result (text data) obtained from the data input by the OCR process is output directly.

In step 302, in the case of determining that the certainty is medium (S<certainty≤T), a data input task is distributed to the operator A and executed (step 303). Subsequently, the character recognition (data input) result (text data) by the OCR process obtained in step 301 and the data input result (text data) obtained in step 303 are compared (step 304).

Subsequently, in the case in which the result of the comparison in step 304 is that the two data input results (text data) match, the matching text data is output, and data entry ends.

On the other hand, in the case in which the result of the comparison in step 304 is that the two data input results (text data) are non-matching, a data input task is distributed to the operator B and executed (step 305). Subsequently, the data input result (text data) obtained in step 305 is output, and data entry ends. Note that the operator A and the operator B preferably are different persons, so that the same mistake (error) due to a misreading of the characters does not occur.

In step 302, in the case of determining that the certainty is low (certainty≤S), a data input task is distributed to the operator C and executed (step 306). Next, a data input task is distributed to an operator D and executed (step 307). Subsequently, the data input result (text data) obtained in step 306 and the data input result (text data) obtained in step 307 are compared (step 308).

Subsequently, in the case in which the result of the comparison in step 308 is that the two data input results (text data) match, the matching text data is output, and data entry ends.

On the other hand, in the case in which the result of the comparison in step 308 is that the two data input results (text data) are non-matching, a data input task is distributed to an operator E and executed (step 309). Subsequently, the data input result (text data) obtained in step 309 is output, and data entry ends.

Note that the operators C, D, and E preferably are different persons, so that the same mistake (error) due to a misreading of the characters does not occur.

In the case of determining that the certainty is low (certainty≤S), the character recognition (data input) result (text data) obtained by the OCR process in step 301 is ignored.

As described above, in the third exemplary embodiment, the content of the data input task (input process) to perform next is decided according to the certainty of the character recognition by the OCR process. Additionally, since data input tasks by operators are not performed in the case in which the certainty is high, the number of data input tasks by operators is reduced. Conversely, in the case in which the certainty is low, the character recognition (data input) result (text data) from the OCR process is not used, and instead, data input tasks are distributed to two operators and executed to secure (ensure) the accuracy of the data input. Additionally, in the case in which the certainty is medium, the character recognition (data input) result (text data) from the OCR process and the data input result from an operator are compared to secure (ensure) the accuracy of the data input and also reduce the number of data input tasks by operators.

(Distributor 500 Applying Third Exemplary Embodiment)

Next, a distributor 500 applying the third exemplary embodiment will be described.

Figure 12:
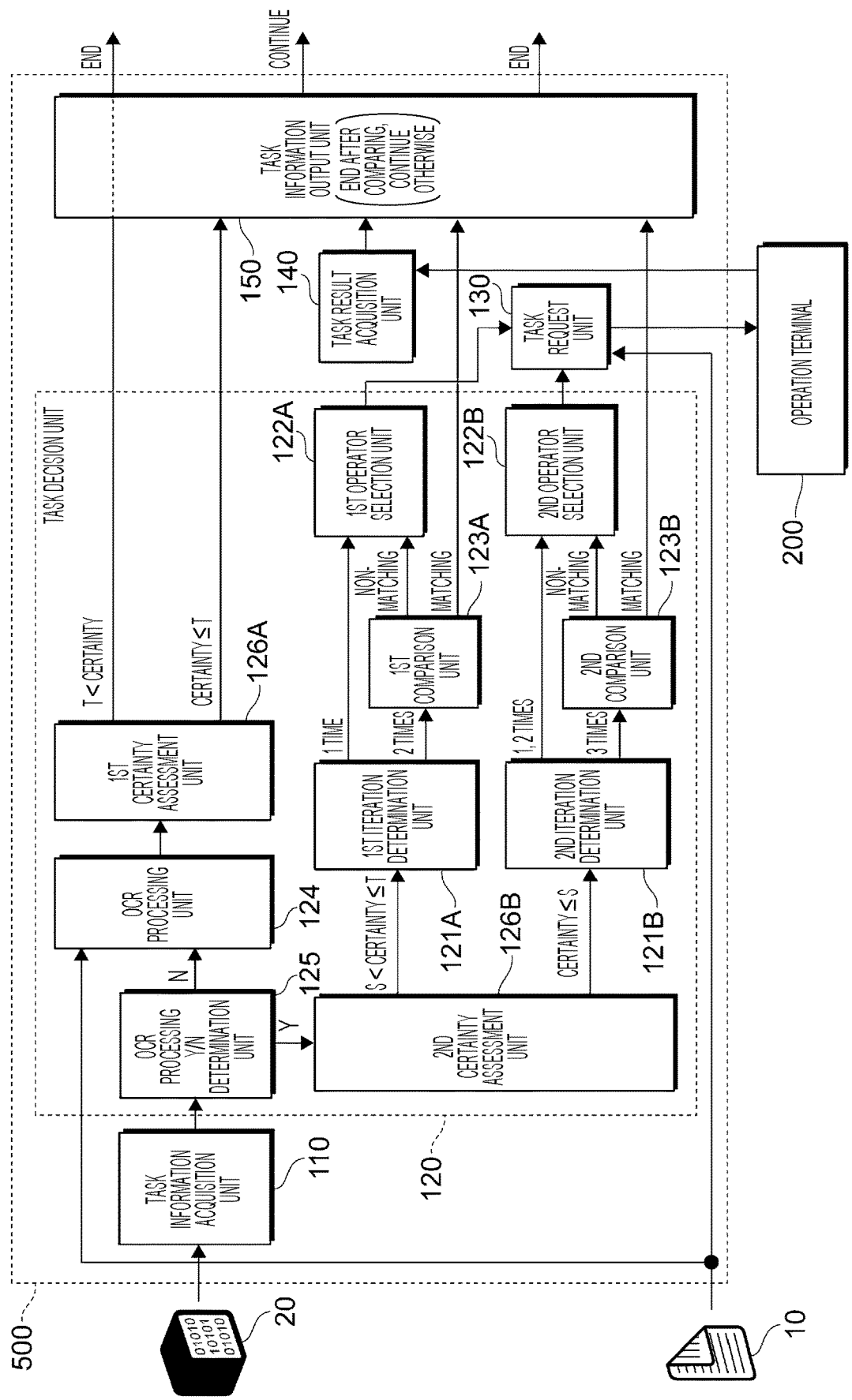
FIG. 12 is a diagram explaining an example of a functional configuration of a distributor applying the third exemplary embodiment.

FIG. 12 is a diagram explaining an example of a functional configuration of the distributor 500 applying the third exemplary embodiment.

Note that the overview of data entry in the distributor 500 is the same as the distributor 100 illustrated in FIG. 3. In other words, it is sufficient to substitute the distributor 500 for the distributor 100 in FIG. 3. Consequently, a description will be omitted.

Hereinafter, the distributor 500 will be described in comparison with the distributor 100. Thus, portions which are the same as the distributor 100 will be denoted with the same or similar signs, and description thereof will be reduced or omitted.

In the distributor 500, the task decision unit 120 is provided with an OCR processing Y/N determination unit 125, an OCR processing unit 124, a 1st certainty assessment unit 126A, a 2nd certainty assessment unit 126B, a 1st iteration determination unit 121A, a 2nd iteration determination unit 121B, a 1st operator selection unit 122A, a 2nd operator selection unit 122B, a 1st comparison unit 123A, and a 2nd comparison unit 123B. The rest of the configuration is similar to the distributor 100.

Note that the distributor 500 acquires the image data 10 and the task information 20. Subsequently, the OCR processing unit 124 and the task request unit 130 acquire the image data 10 acquired by the distributor 500, and the task information acquisition unit 110 acquires the task information 20 acquired by the distributor 500.

The OCR processing Y/N determination unit 125 determines the presence or absence of an OCR process, on the basis of the task information 20. The OCR processing unit 124 performs text data conversion through character recognition by an OCR process similarly to the second exemplary embodiment (see FIG. 9). The 1st certainty assessment unit 126A assesses the certainty of the character recognition by the OCR process performed by the OCR processing unit 124. The 2nd certainty assessment unit 126B assesses the certainty of the character recognition by the OCR process on the basis of the task information 20. The 1st iteration determination unit 121A and the 2nd iteration determination unit 121B, similarly to the iteration determination unit 121 in the first exemplary embodiment and the second exemplary embodiment, determine the number of already-performed data input tasks on the basis of the task information 20 (see FIGS. 4 and 9). The 1st operator selection unit 122A and the 2nd operator selection unit 122B, similarly to the operator selection unit 122 in the first exemplary embodiment and the second exemplary embodiment, select the operator to request to perform the next data input task (see FIGS. 4 and 9). The 1st comparison unit 123A and the 2nd comparison unit 123B, similarly to the comparison unit 123 in the first exemplary embodiment and the second exemplary embodiment, compares the data input results from already-performed data input tasks (see FIGS. 4 and 9). The rest of the configuration of the distributor 500 is the same as the distributor 100.

Next, connection relationships in the distributor 500 will be described.

The task information acquisition unit 110 is connected to the OCR processing Y/N determination unit 125. The OCR processing Y/N determination unit 125 is connected to the OCR processing unit 124 and the 2nd certainty assessment unit 126B. Depending on the presence or absence of an OCR process determined by the OCR processing Y/N determination unit 125, the flow branches to the OCR processing unit 124 or the 2nd certainty assessment unit 126B. The OCR processing unit 124 is connected to the 1st certainty assessment unit 126A. The 1st certainty assessment unit 126A is connected to the task information output unit 150.

The 2nd certainty assessment unit 126B is connected to the 1st iteration determination unit 121A and the 2nd iteration determination unit 121B. The 1st iteration determination unit 121A is connected to the 1st operator selection unit 122A and the 1st comparison unit 123A. The 2nd iteration determination unit 121B is connected to the 2nd operator selection unit 122B and the 2nd comparison unit 123B. The 1st operator selection unit 122A and the 2nd operator selection unit 122B are connected to the task request unit 130.

Next, the operation of the distributor 400 will be described with focus on the portions which are different from the distributor 100.

The task information acquisition unit 110 acquires the task information 20 from among the image data 10 and the task information 20 acquired by the distributor 400. The OCR processing Y/N determination unit 125 determines the presence or absence of an OCR process on the basis of the task information 20 acquired by the task information acquisition unit 110.

Subsequently, in the case in which the OCR processing Y/N determination unit 125 determines that an OCR process has not been performed (N), the flow branches to the OCR processing unit 124. The OCR processing unit 124 performs an OCR process (character recognition) on the image data 10 to convert a character string to text data. Herein, assume that the OCR process is the execution of one data input task.

Additionally, the 1st certainty assessment unit 126A assesses the certainty of the character recognition by the OCR process. Herein, the 1st certainty assessment unit 126A classifies the degree of character recognition by the OCR process into the three levels "high (T<certainty)", "medium (S<certainty≤T)", and "low (certainty≤S)" in association with the threshold values T and S. Note that the threshold value T is taken to be greater than the threshold value S (S<T).

The case in which the OCR processing Y/N determination unit 125 determines that an OCR process has not been performed (N) corresponds to the timing of starting one data entry, or in other words, the initial state.

Herein, in the case in which the 1st certainty assessment unit 126A assesses that the certainty exceeds the threshold value T ("high (T<certainty)"), the task information output unit 150 creates task information 20 associating the character recognition (data input) result from the OCR process with the image data 10 in the task information 20. Note that since the certainty of the character recognition is high ("high (T<certainty)"), data entry ends. Thus, the task information output unit 150 may also write an indication that data entry has ended in the task information 20.

On the other hand, in the case in which the 1st certainty assessment unit 126A assesses that the certainty is the threshold value T or less (certainty≤T), the task information output unit 150 creates task information 20 associating the data input result, the data input method, and the certainty with the image data 10. Herein, the data input result is the data input result (text data) recognized by the OCR process, the data input method is OCR, and the certainty is "medium (S<certainty≤T)" or "low (certainty≤S)". Note that, as illustrated in the task information 20 of FIG. 10B, other information, such as the character position and the character string position, may also be included. In this case, the flow proceeds to "Continue".

In the case in which the OCR processing Y/N determination unit 125 determines that the OCR process has been performed (Y) on the basis of the task information 20, the flow branches to the 2nd certainty assessment unit 126B. Subsequently, the 2nd certainty assessment unit 126B assesses the certainty of the OCR process on the basis of the task information 20. In the case in which the OCR processing Y/N determination unit 125 determines that the OCR process has been performed (Y), the task information 20 includes the certainty assessed by the 1st certainty assessment unit 126A.

In the case in which the certainty assessed by the 2nd certainty assessment unit 126B is "medium (S<certainty≤T)", the 1st iteration determination unit 121A determines the number of already-performed data input tasks on the basis of the task information 20.

In the case in which the 1st iteration determination unit 121A determines that the number of already-performed data input tasks is 1 time (corresponding to the OCR process), the flow branches to the 1st operator selection unit 122A. The 1st operator selection unit 122A selects an operator to request to perform the next data input task. Subsequently, the task request unit 130 requests the operation terminal 200 of the selected operator to perform a data input task. The task result acquisition unit 140 acquires the data input result from the selected operator. Subsequently, the task information output unit 150 outputs task information 20 including the data input result and the data input method (the operator (name)).

In the case in which the 1st iteration determination unit 121A determines that the number of already-performed data input tasks is 2 times (the data input task by the OCR process and the data input task by the operator), the 1st comparison unit 123A compares the data input result from the OCR process and the data input result from the operator. Subsequently, in the case in which the 1st comparison unit 123A determines that the data input results are matching, the task information output unit 150 creates task information 20 including the comparison result ("Matching") in association with the image data 10. At this time, the task information output unit 150 may also create task information 20 including an indication that data entry has ended ("End").

On the other hand, in the case in which the 1st comparison unit 123A determines that the data input results are non-matching, the 1st operator selection unit 122A selects an operator to request to perform the next data input task. Subsequently, the task request unit 130 requests the selected operator to perform a data input task. The task result acquisition unit 140 acquires the data input result from the selected operator. Subsequently, the task information output unit 150 creates and outputs task information 20 including the data input result and the data input method (the operator (name)) in association with the image data 10.

On the other hand, in the case in which the 2nd certainty assessment unit 126B assesses that the certainty is "low (certainty≤S)", the 2nd iteration determination unit 121B determines the number of already-performed data input tasks on the basis of the task information 20. In the case in which the 2nd iteration determination unit 121B determines that the number of already-performed data input tasks is 1 time or 2 times, the 2nd operator selection unit 122B selects an operator to request to perform the next data input task. Note that, as described above, since the OCR process by the OCR processing unit 124 is also counted as a data input task, the case in which the number of already-performed data input tasks is 1 time refers to the case in which the data input task has been performed by the OCR process. Additionally, the case in which the number of already-performed data input tasks is 2 times refers to the case in which the data input task by the OCR process and the data input task by an operator have been performed.

Subsequently, the task request unit 130 requests the operation terminal 200 of the selected operator to execute a data input task. The task result acquisition unit 140 acquires the data input result from the selected operator. Subsequently, the task information output unit 150 creates and outputs task information 20 including the data input result and the data input method (the operator (name)) in association with the image data 10.

On the other hand, in the case in which the 2nd iteration determination unit 121B determines that the number of already-performed data input tasks is 3 times, the 2nd comparison unit 123B compares the two data input results performed by operators. Herein, the data input result from the OCR process is of low certainty, and thus is not treated as a target of comparison. Subsequently, in the case in which the 2nd comparison unit 123B determines that the data input results are matching, the task information output unit 150 creates and outputs task information 20 including the comparison result ("Matching") in association with the image data 10, and data entry ends. At this time, the task information output unit 150 may also create task information 20 including an indication that data entry has ended ("End").

Note that in the case in which the 2nd comparison unit 123B determines that the data input results are non-matching, the 2nd operator selection unit 122B selects an operator to request to perform the next data input task. Subsequently, the task request unit 130 requests the operation terminal 200 of the selected operator to execute a data input task. The task result acquisition unit 140 acquires the data input result from the selected operator. Subsequently, the task information output unit 150 creates and outputs task information 20 including the data input result and the data input method (the operator (name)) in association with the image data 10 in the task information 20, and data entry ends. At this time, the task information output unit 150 may also create task information 20 including an indication that data entry has ended ("End") in the task information 20.

As described above, the distributor 500 executes the data entry illustrated in FIG. 11.

As described above, a data entry task starts with an OCR process, and the content of the data input task (input process) to perform next is decided according to the certainty of the character recognition by the OCR process. At this time, in the case in which the certainty of the OCR process is high (T<certainty), the data input result (text data) from the OCR process is adopted directly. With this configuration, the number of data input tasks executed by operators is reduced.

Also, in the case in which the certainty of the character recognition by the OCR process is medium (S<certainty≤T), the data input result from the OCR process and a data input result from an operator are compared. Subsequently, if the data input results are matching, the data input result is adopted, whereas if the data input results are non-matching, a data input task is distributed to an operator and executed again, and the data input result is adopted.

Additionally, in the case in which the certainty of the character recognition by the OCR process is low (certainty≤S), the data input result from the OCR process is not used, and the data input results from two operators are compared. Subsequently, if the data input results are matching, the data input result is adopted, whereas if the data input results are non-matching, a data input task is distributed to an operator and executed again, and the data input result is adopted.

With this configuration, in the case in which the certainty of the OCR process is high or medium, the data input result from the OCR process is used, whereas in the case in which the certainty of the OCR process is low, the data input result from the OCR process is not used. With this arrangement, the number of data input tasks by operators is reduced while still ensuring the accuracy of data input.

Note that in FIG. 12, the portion of the 1st iteration determination unit 121A, the 1st operator selection unit 122A, and the 1st comparison unit 123A of the task decision unit 120 of the distributor 500 corresponds to the task decision unit 120 in the distributor 400 applying the second exemplary embodiment.

Also, the portion of the 2nd iteration determination unit 121B, the 2nd operator selection unit 122B, and the 2nd comparison unit 123B of the task decision unit 120 of the distributor 500 corresponds to the task decision unit 120 in the distributor 100 applying the first exemplary embodiment. Note that herein, since the data input task by the OCR process is counted as 1 time, in the 2nd iteration determination unit 121B, the number of already-performed data input tasks is set to +1.

Next, an exemplary modification of the third exemplary embodiment will be described.

(Exemplary Modification 3-1 of Third Exemplary Embodiment)

In the above, in the case in which the certainty of the OCR process is "high (T<certainty)", the data input result (text data) from the OCR process is adopted.

In exemplary modification 3-1, the data input result (text data) from the OCR process is not adopted.

Figure 13:
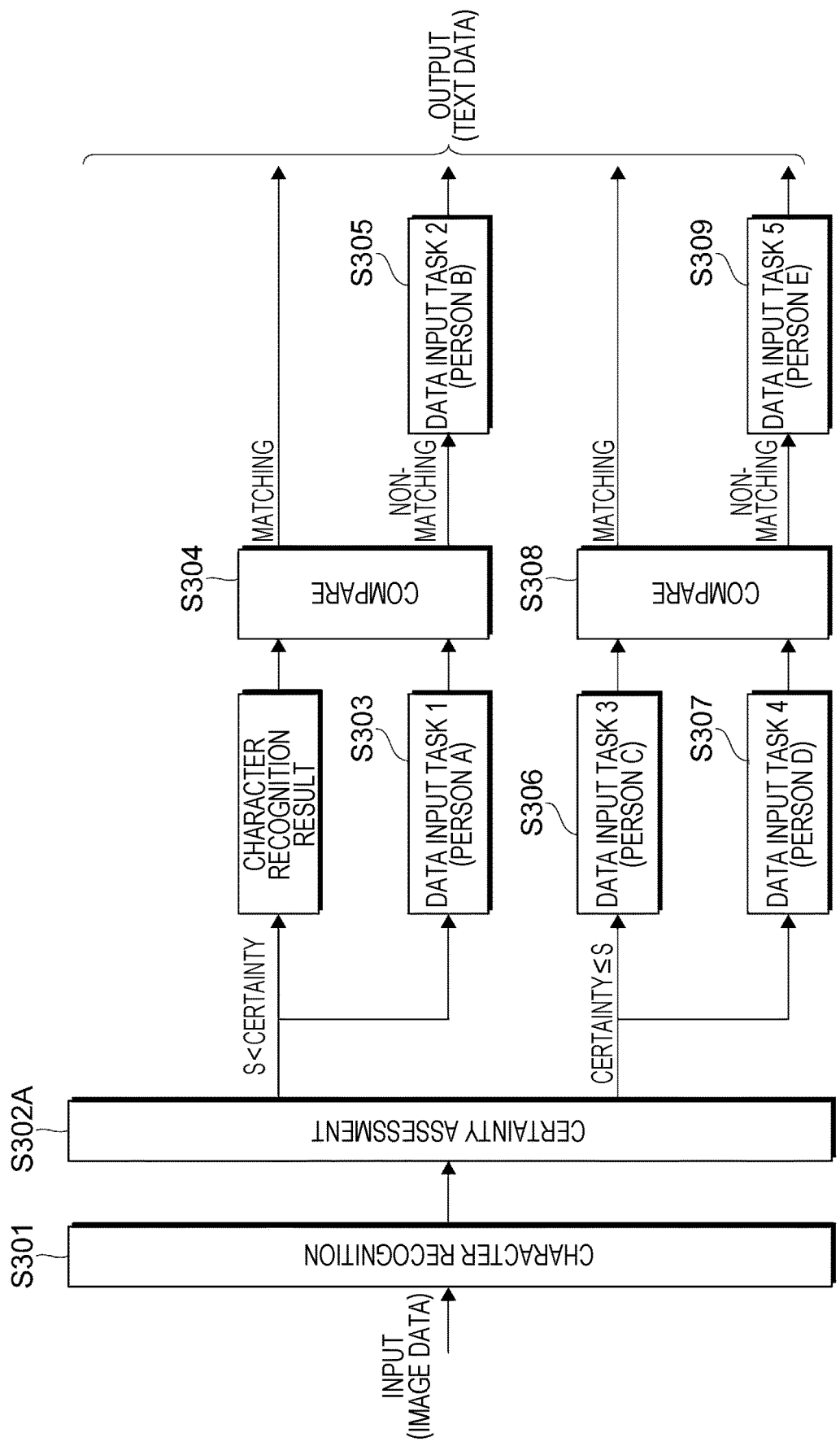
FIG. 13 is a flowchart of data entry according to exemplary modification 3-1.

FIG. 13 is a flowchart of data entry according to exemplary modification 3-1.

In step 302A instead of step 302 of FIG. 11, the certainty of the character recognition by the OCR process is assessed by the two levels of "medium (S<certainty)" and "low (certainty≤S)". Note that the threshold value S of exemplary modification 3-1 and the threshold value S illustrated in FIG. 11 may be different.

Figure 14:
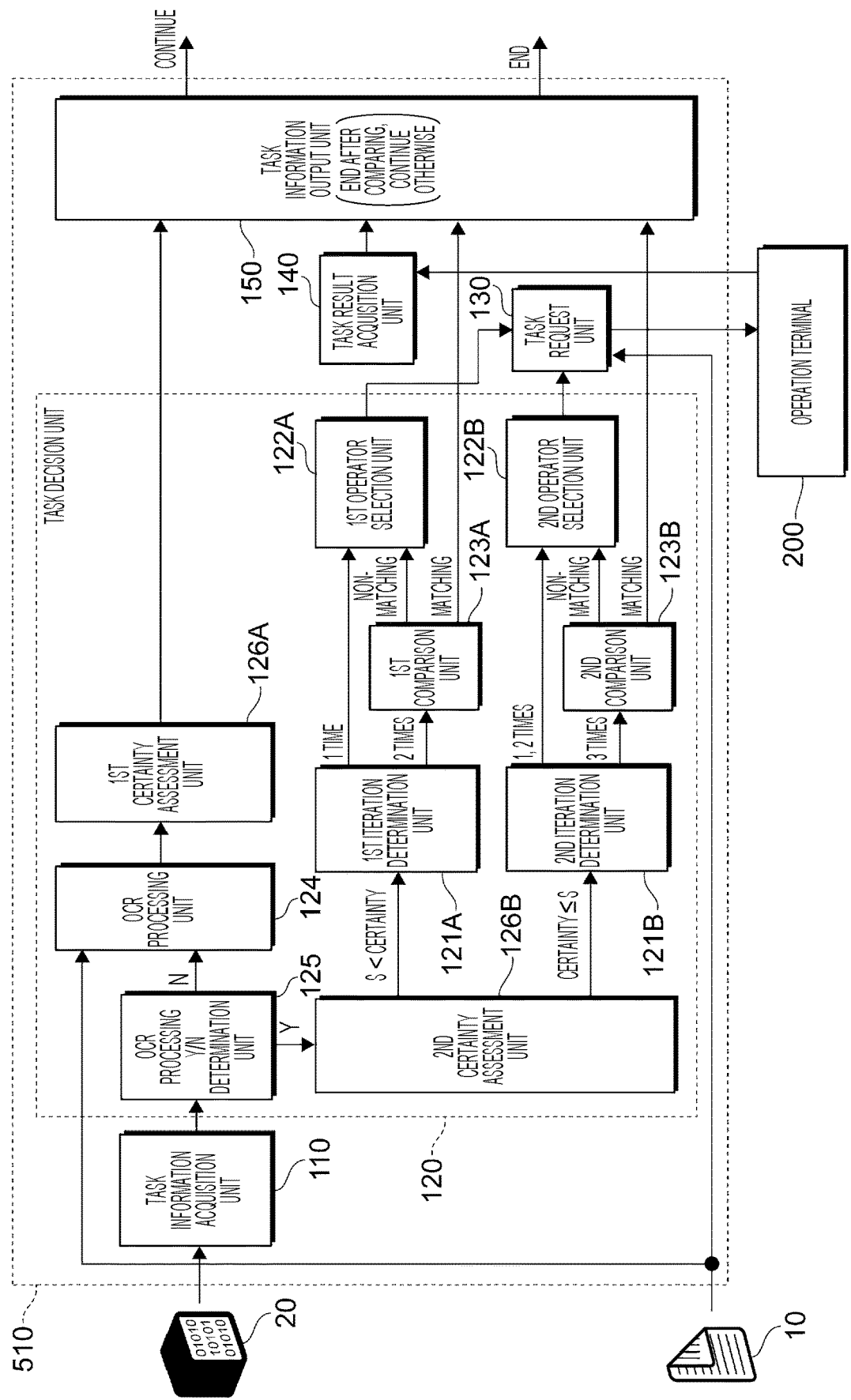
FIG. 14 is a diagram explaining an example of a functional configuration of a distributor applying the exemplary modification 3-1.

FIG. 14 is a diagram explaining an example of a functional configuration of a distributor 510 applying the exemplary modification 3-1. Herein, portions which are the same as the distributor 500 illustrated in FIG. 12 will be denoted with the same signs.

In the distributor 510, as described later, the 1st certainty assessment unit 126A assesses the certainty by the two levels of "medium (S<certainty)" and "low (certainty≤S)".

Additionally, the 2nd certainty assessment unit 126B assesses the certainty by the two levels of "medium (S<certainty)" and "low (certainty≤S)".

Since the distributor 510 operates in the same way as the distributor 500 illustrated in FIG. 12 except that the cases of the certainty being "high (T<certainty)" in the distributor 500 are included in "medium (S<certainty)", a description of operation will be omitted.

(Exemplary Modification 3-2 of Third Exemplary Embodiment)

Exemplary modification 3-2 omits the case of the certainty of the character recognition by the OCR process being "medium (S<certainty≤T)" in the data entry according to the third exemplary embodiment illustrated in FIG. 11. In other words, a comparison between the data input result from the OCR process and the data input result from an operator is not performed.

Figure 15:
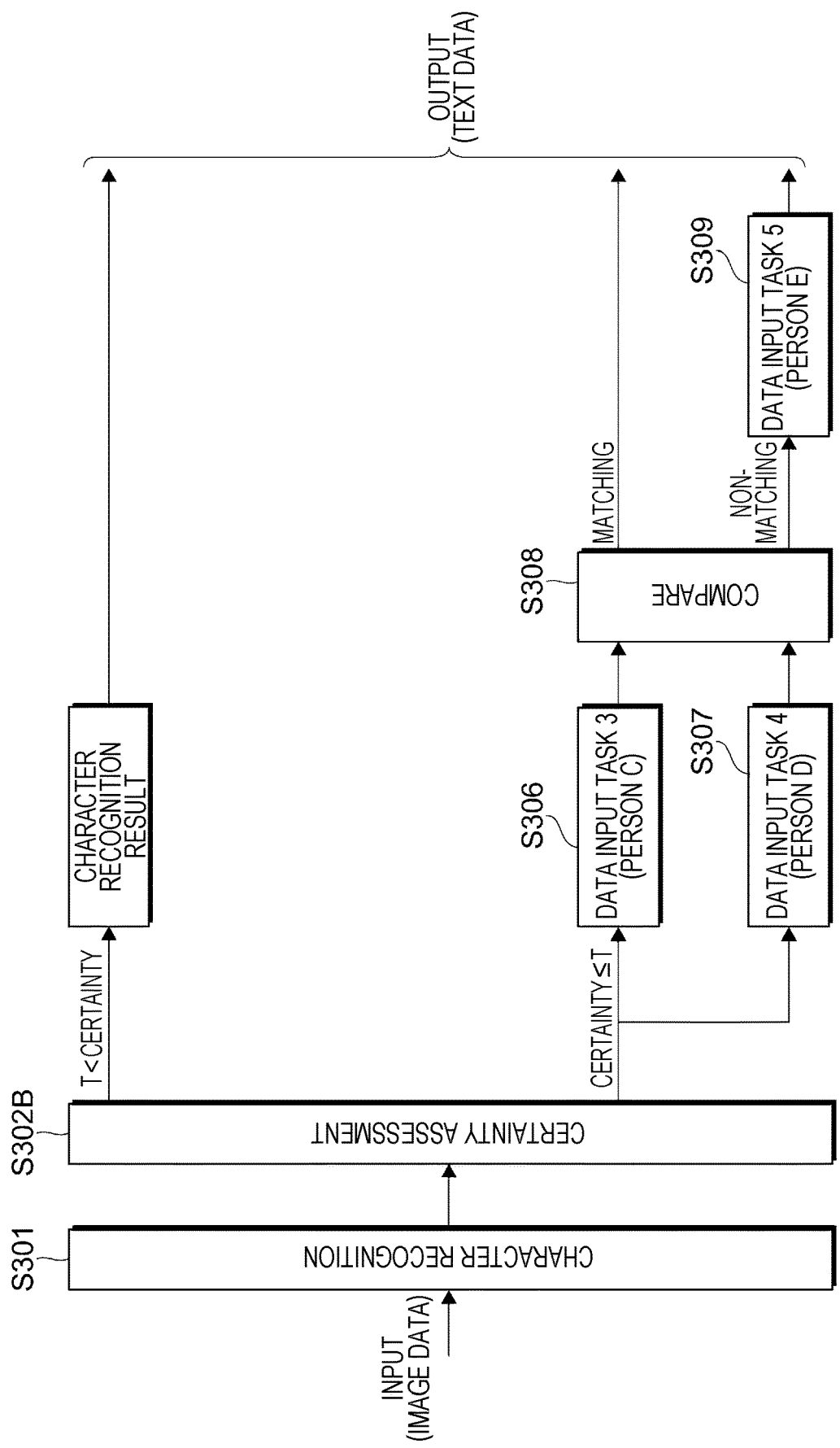
FIG. 15 is a flowchart of data entry according to exemplary modification 2.

FIG. 15 is a flowchart of data entry according to exemplary modification 2.

In step 302B instead of step 302 in FIG. 11, the certainty of the character recognition by the OCR process is assessed by the two levels of "high (T<certainty)" and "not high (certainty≤T)". Note that the threshold value T of exemplary modification 3-2 and the threshold value T illustrated in FIG. 11 may be different.

Figure 16:
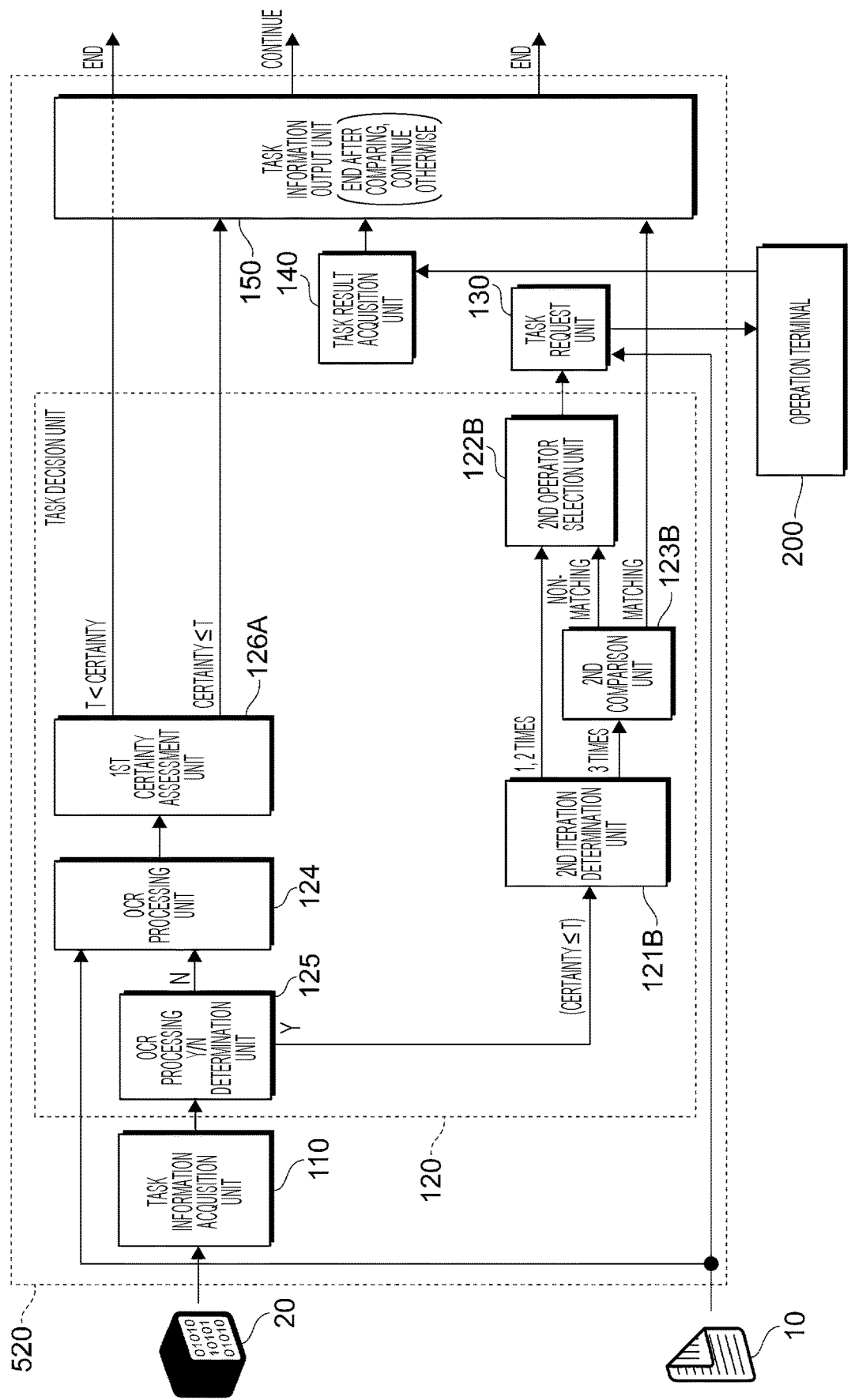
FIG. 16 is a diagram explaining an example of a functional configuration of a distributor applying the exemplary modification 3-2.

FIG. 16 is a diagram explaining an example of a functional configuration of a distributor 520 applying the exemplary modification 3-2. Herein, portions which are the same as the distributor 500 illustrated in FIG. 12 will be denoted with the same signs.

In the distributor 520, the 1st certainty assessment unit 126A assesses the certainty by the two levels of "high (T<certainty)" and "not high (certainty≤T)".

Subsequently, in the case in which the 1st certainty assessment unit 126A assesses that the certainty is "high (T<certainty)", the task information output unit 150 creates and outputs task information 20 including the data input result (text data) from the OCR process and the data input method (in this case, OCR) in association with the image data 10. Subsequently, the data input result (text data) is adopted, and data entry ends.

At this point, a comparison between the data input result from the OCR process and the data input result from an operator is not performed. Thus, the distributor 520 takes a configuration in which the 2nd certainty assessment unit 126B, the 1st iteration determination unit 121A, the 1st operator selection unit 122A, and the 1st comparison unit 123A are removed from the distributor 500 illustrated in FIG. 12. Additionally, the "Y" case of the OCR processing Y/N determination unit 125 is connected to the 2nd iteration determination unit 121B.

Since the distributor 530 operates in the same way as the distributor 500 illustrated in FIG. 12 except that the case of the certainty being "medium (S<certainty≤T)" and "low (certainty≤S)" in FIG. 12 is included in "not high (certainty≤T)", a description of operation will be omitted.

(Exemplary Modification 3-3 of Third Exemplary Embodiment)

Exemplary modification 3-3 omits the case of the certainty of the OCR process being "low (certainty<S)" in the data entry according to the third exemplary embodiment illustrated in FIG. 11. In other words, a comparison between the data input results by two operators is not performed.

Figure 17:
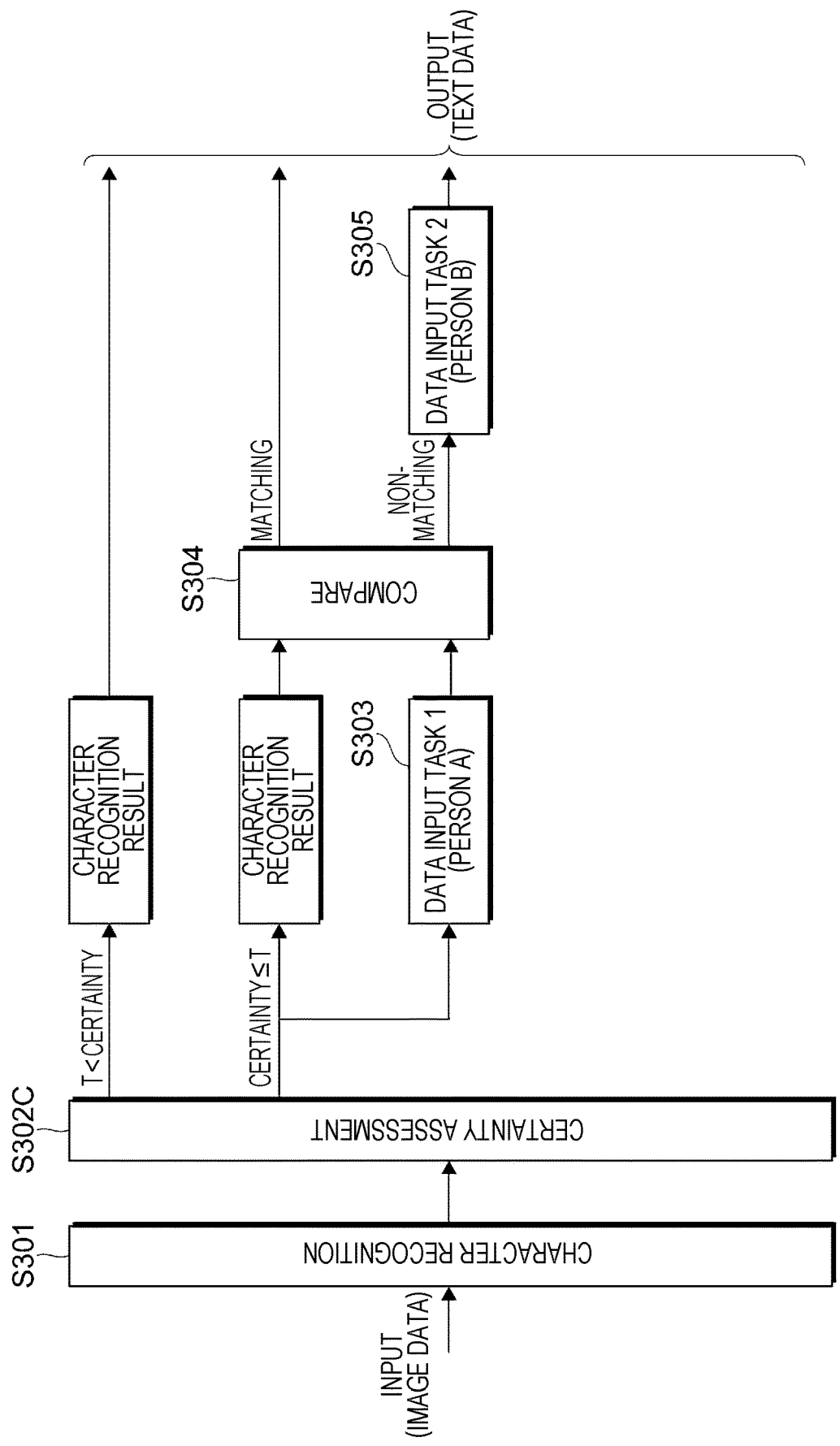
FIG. 17 is a flowchart of data entry according to exemplary modification 3-3.

FIG. 17 is a flowchart of data entry according to exemplary modification 3-3.

In step 302C instead of step 302 in FIG. 11, the certainty of the character recognition by the OCR process is assessed by the two levels of "high (T<certainty)" and "not high (certainty≤T)". Note that the threshold value T of exemplary modification 3-3 and the threshold value T illustrated in FIG. 11 may be different.

Figure 18:
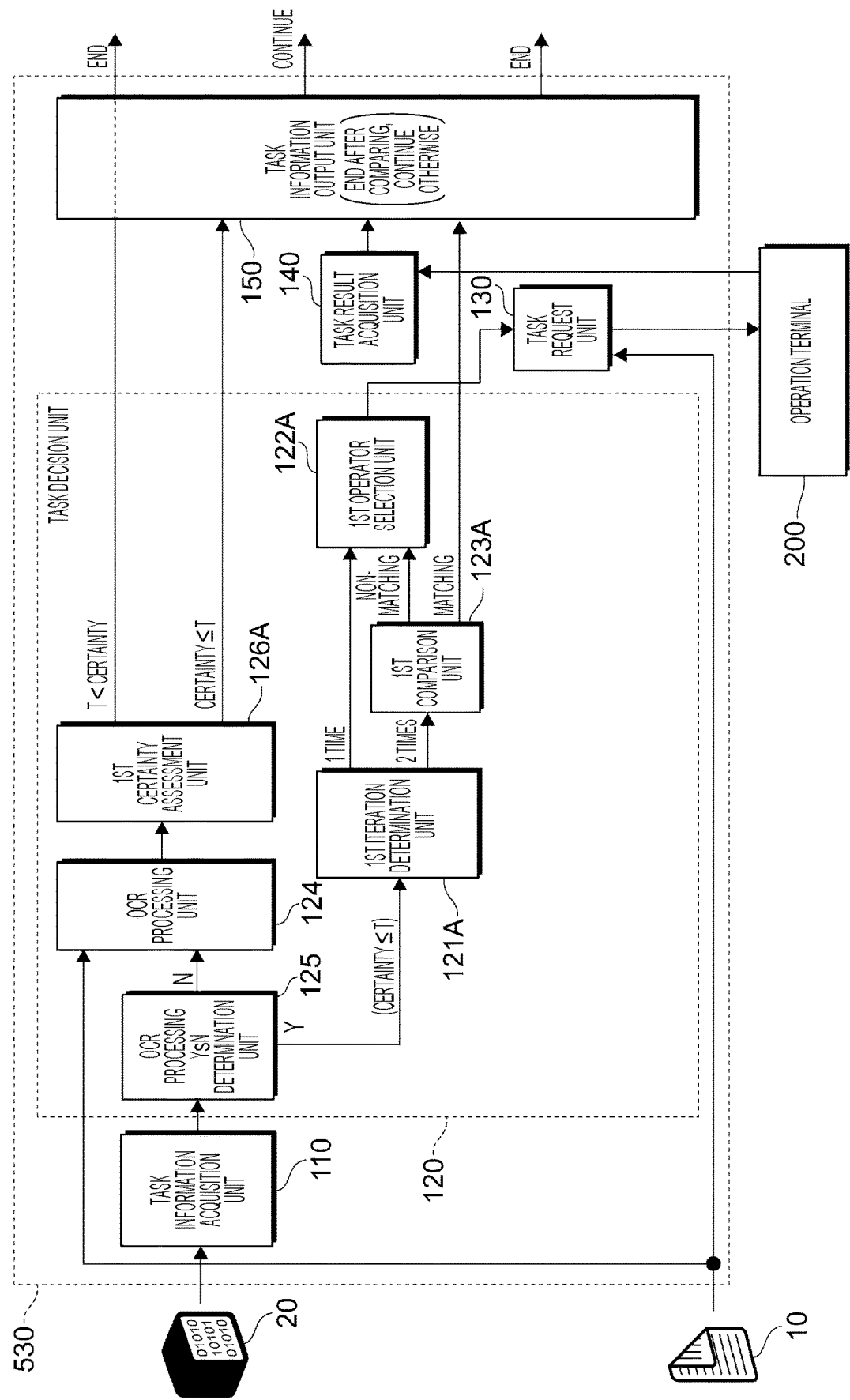
FIG. 18 is a diagram explaining an example of a functional configuration of a distributor according to exemplary modification 3-3.

FIG. 18 is a diagram explaining an example of a functional configuration of a distributor 530 according to exemplary modification 3-3. Herein, portions of the configuration which are the same as the distributor 500 illustrated in FIG. 12 will be denoted with the same signs.

In the distributor 530, the 1st certainty assessment unit 126A assesses the certainty by the two levels of "high (T<certainty)" and "not high (certainty≤T)".

Subsequently, in the case in which the 1st certainty assessment unit 126A assesses that the certainty is "high (T<certainty)", the task information output unit 150 creates and outputs task information 20 including the data input result (text data) from the OCR process and the data input method (in this case, OCR) in association with the image data 10. Subsequently, the data input result (text data) is adopted, and data entry ends.

At this point, a comparison between the data input results by two operators is not performed. Thus, the distributor 530 takes a configuration in which the 2nd certainty assessment unit 126B, the 2nd iteration determination unit 121B, the 2nd operator selection unit 122B, and the 1st comparison unit 123A are removed from the distributor 500 illustrated in FIG. 12. Additionally, the "Y" case of the OCR processing Y/N determination unit 125 is connected to the 1st iteration determination unit 121A.

Since the distributor 530 operates in the same way as the distributor 500 illustrated in FIG. 12 except that the case of the certainty being "medium (S<certainty≤T)" and "low (certainty≤S)" in FIG. 12 is included in "not high (certainty≤T)", a description of operation will be omitted.

Fourth Exemplary Embodiment

The first exemplary embodiment to the third exemplary embodiment describe handling a single data entry which is performed by executing multiple data input tasks distributed by distributors (distributors 100, 400, 500, 510, 520, 530). In particular, by having the distributor decide the process to perform next on the basis of the task information 20, simplified management of the progress of data entry is described.

In the fourth exemplary embodiment, the case of processing multiple data entries is described. Herein, multiple distribution servers equipped with the functions of the distributors described in the first exemplary embodiment to the third exemplary embodiment are provided, and the multiple distribution servers are run in parallel to execute data input tasks related to multiple data entries. In other words, the multiple distribution servers distribute multiple data input tasks related to multiple data entries in parallel to multiple operators, and cause the multiple operators to execute the multiple data input tasks. A system that processes multiple data entries while distributing data input tasks through multiple distribution servers is designated a distribution server system. Note that the distribution server system is one example of an information processing system.

By providing and running multiple distribution servers in parallel in this way, distribution is not limited by time or location. Also, parallelization enables faster data entry and increased throughput to be realized.

Each distribution server has a hardware configuration similar to the distributor 100 illustrated in FIG. 6.

Note that the multiple distribution servers do not have to be physically separated. For example, the multiple distribution servers may also be multiple processes running on a single CPU (the CPU 301 in FIG. 6). In addition, the multiple distribution servers may also be respective processing operations performed in a time series inside the same process. In other words, it is sufficient for the multiple distribution servers to run logically separate processes of distributing individual data input tasks.

Figure 19B:
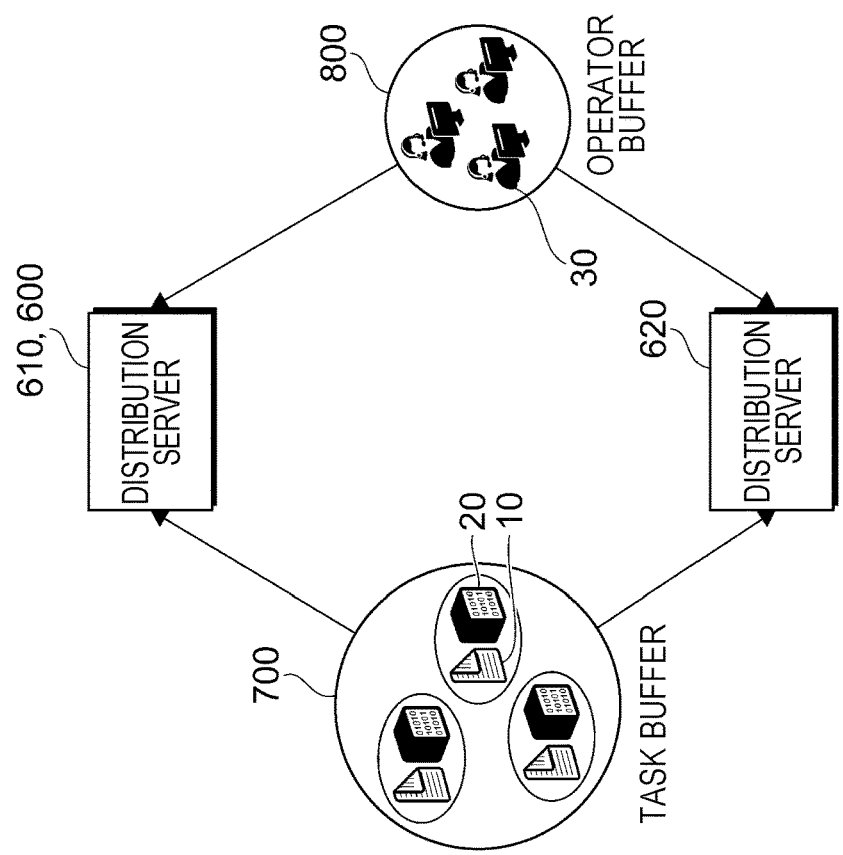
Figure 19A:
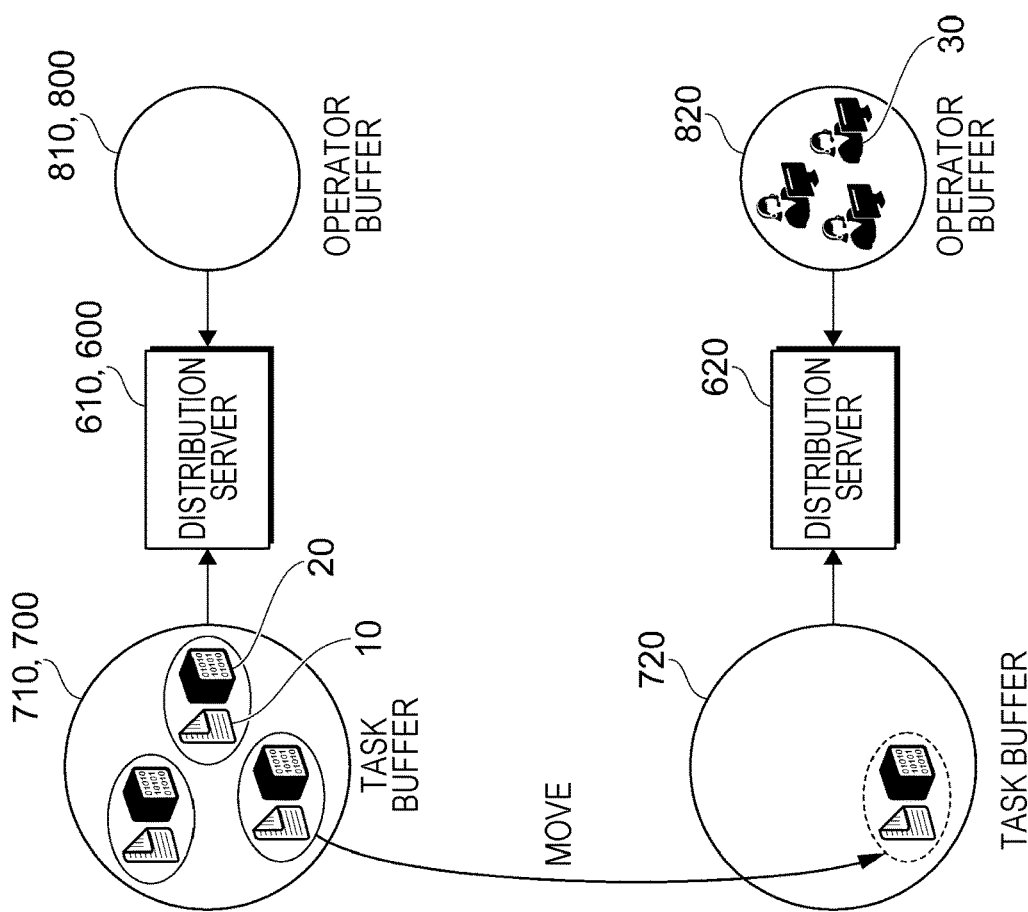

FIGS. 19A and 19B are diagrams explaining an overview of a distribution server system applying the fourth exemplary embodiment, in which FIG. 19A is a case in which multiple distribution servers 600 are included, and each distribution server 600 is provided with a task buffer 700 and an operator buffer 800, while FIG. 19B is a case in which multiple distribution servers 600 are included, and the task buffer 700 and the operator buffer 800 are shared. The task buffer 700 is one example of a storage unit, and the operator buffer 800 is one example of an inputter registration unit.

First, FIG. 19A will be described. FIG. 19A illustrates a case in which there are two distribution servers 600. Additionally, the distribution servers 600 are respectively provided with task buffers 700 and operator buffers 800. The task buffers 700 hold data input tasks to be performed next (data input tasks for which data input is requested). In other words, the task buffers 700 hold data input tasks which have not reached "End" in the first exemplary embodiment to the third exemplary embodiment. On the other hand, the operator buffers 800 hold operators (names) 30 capable of executing data input tasks. For example, the operator buffers 800 may hold operators (names) 30 who are not currently executing a data input task, or the number of data input tasks currently being executed and distributed may be registered together with operators (names) 30. Herein, the operator buffers 800 will be described as holding operators (names) 30 who are not currently executing a data input task.

Note that the operator buffers 800 holding operators 30 means that operators 30 are registered, and when an operator 30 to request to perform a data input task is selected, the data input task is transmitted from a distribution server 600 to the operation terminal 200 (see FIG. 4) operated by that operator 30. In other words, the multiple operators 30 may not only be collected in a single location close to the distribution servers 600, but also may be in remote locations distant from the distribution servers 600. In other words, the distribution servers 600 and the operators 30 (operation terminals 200) may be connected through a wired network or a wireless network used in a LAN, a metropolitan area network (MAN), a wide area network (WAN), the Internet, an intranet, or the like, or by a combination of such networks. Note that the distribution servers 600 and the task buffers 700 may also be connected similarly.

In addition, the task buffers 700 and/or the operator buffers 800 may also be provided inside the distribution servers 600.

In other words, the distribution servers 600 acquire a single data input task from the task buffers 700, and select an operator 30 to request to execute the data input task from the operator buffers 800. Subsequently, the data input task is transmitted to the operation terminal 200 (see FIG. 4) of the selected operator 30, and the operator 30 is requested to execute the data input task.

Herein, the distribution servers 600 will be denoted the distribution servers 610 and 620 when being individually distinguished. Additionally, in correspondence with the individually distinguished distribution servers 610 and 620, the task buffers 700 and the operator buffers 800 will be denoted the task buffer 710 and the operator buffer 810 on the distribution server 610 side, and will be denoted the task buffer 720 and the operator buffer 820 on the distribution server 620 side.

Herein, in the task buffers 700, the image data 10 and the task information 20 related to a data input task are associated together and stored as a pair. Additionally, the distribution servers 600 do not store task information 20. Herein, storing as a pair means that the image data 10 and the task information 20 are not only stored in a linked state, but additionally are movable without being separated. For example, in the case in which there are multiple task buffers 700 and data input tasks are moved among the task buffers 700, the task information 20 is moved together with the image data 10. One example of storing as a pair is to store the image data 10 and the task information 20 in a single folder, and move the entire folder among the task buffers 700.

In the individual distribution servers 600, it is desirable to strike a balance between the number of data input tasks stored in the task buffers 700 and the number of operators not executing a data input task who are registered in the operator buffers 800, such that a wait does not occur for a data input task. However, if the number of data input tasks and the number of operators are unbalanced, a wait may occur for a data input task, or a wait may occur for an operator.

In FIG. 19A, on the distribution server 610 side, there are three data input tasks in the task buffer 710, but in the operator buffer 810, there are no operators (0 persons) who are not executing a data input task. For this reason, the distribution server 610 may not distribute a certain data input task in the task buffer 710. In other words, a wait occurs for a data input task.

On the other hand, on the distribution server 620, there are no data input tasks (0 tasks) in the task buffer 720. However, in the operator buffer 820, there are three operators who are not executing a data input task. In other words, a wait occurs for an operator.

In the case described above, a wait is occurring for a data input task in the distribution server 610, and a wait is occurring for an operator in the distribution server 620. Thus, if a data input task is moved from the distribution server 610 side to the distribution server 620 side, the wait for a data input task in the distribution server 610 and the wait for an operator in the distribution server 620 are addressed. With this arrangement, the efficiency of executing data input tasks is improved.

At this time, in the task buffer 710, the image data 10 and the task information 20 related to a data input task are stored as a pair. Accordingly, the image data 10 and the task information 20 are moved as a pair from the task buffer 710 to the task buffer 720 (the move indicated by the arrow). Additionally, if the distribution server 620 distributes this data input task to an operator registered in the operator buffer 820, the data input task is executed.

Next, FIG. 19B will be described. In FIG. 19B, there are two distribution servers 600 (distribution servers 610 and 620). However, there is one each of the task buffer 700 and the operator buffer 800, which are shared between the two distribution servers 600 (distribution servers 610 and 620). Additionally, the task buffer 700 holds three data input tasks, and in the operator buffer 800, three operators who are not executing a data input task are registered. Note that each data input task is stored as a pair of the image data 10 and the task information 20. Additionally, the distribution servers 610 and 620 do not store task information 20.

In this case, the distribution server 610 may distribute a data input task in the task buffer 700 to an operator in the operator buffer 800 for execution, and the distribution server 620 may distribute a data input task in the task buffer 700 to an operator registered in the operator buffer 800 for execution. In the task buffer 700, since the task information 20 is stored together with the image data 10, both the distribution server 610 and the distribution server 620 are able to distribute a data input task to an operator for execution, on the basis of the acquired task information 20.

Note that the distribution server 600, the task buffer 700, and/or the operator buffer 800 may also be integrated. In other words, the distribution server 600 may also include the task buffer 700 and/or the operator buffer 800.

FIGS. 20A and 20B are diagrams explaining an overview of a distribution server system not applying the fourth exemplary embodiment illustrated for the sake of comparison, in which FIG. 20A is a case in which multiple distribution servers 600 are included, and each distribution server 600 is provided with a task buffer 700 and an operator buffer 800, while FIG. 20B is a case in which multiple distribution servers 600 are included, and the task buffer 700 and the operator buffer 800 are shared.

FIG. 20A will be described. FIG. 20A illustrates a case in which there are two distribution servers 600. Additionally, the distribution servers 600 are respectively provided with task buffers 700 and operator buffers 800. Furthermore, the distribution servers 600 are respectively provided with task information databases 900 that store task information 20. Note that, similarly to the case illustrated in FIG. 19A, the distribution servers 600 will be denoted the distribution servers 610 and 620 when being individually distinguished. Additionally, in correspondence with the individually distinguished distribution servers 610 and 620, the task buffers 700, the operator buffers 800, and the task information databases 900 will be denoted the task buffer 710, the operator buffer 810, and the task information database 910 on the distribution server 610 side, and will be denoted the task buffer 720, the operator buffer 820, and the task information database 920 on the distribution server 620 side.

The task information databases 900 stores task information 20 related to data input tasks held in the task buffers 700 provided in the distribution servers 600. In other words, the task information database 910 stores task information 20 related to data input tasks held in the task buffer 710 provided in the distribution server 610, while the task information database 920 stores task information 20 related to data input tasks held in the task buffer 720 provided in the distribution server 620. In this case, the task buffers 710 and 720 store image data 10 related to data input tasks.

Herein, three pieces of image data 10 related to data input tasks are being stored in the task buffer 710. In other words, there are three data input tasks. No image data 10 related to data input tasks is being stored in the task buffer 720. In other words, there are zero data input tasks. In other words, on the distribution server 610 side, a wait occurs for a data input task.

On the other hand, in the operator buffer 810, there are no (registered) operators 30 (0 persons) who are not executing a data input task. In the operator buffer 820, there are three (registered) operators 30 who are not executing a data input task. In other words, on the distribution server 620 side, a wait occurs for an operator 30.

Hypothetically, assume that there are multiple operators 30 registered in the operator buffer 810. In this case, the distribution server 610 is able to distribute a data input task held in the task buffer 710 to a (registered) operator who is not executing a data input task in the operator buffer 810, and cause the data input task to be executed. In other words, it is sufficient for the distribution server 610 to acquire the image data 10 related to a data input task from the task buffer 710 while also acquiring the task information 20 related to the data input task from the task information database 910, and on the basis of the task information 20, select an operator 30 to request to execute the data input task from among the operators 30 registered in the operator buffer 810, and thereby cause the data input task to be executed.

However, as described above, a wait is occurring for a data input task on the distribution server 610 side, and a wait is occurring for an operator on the distribution server 620 side.

Accordingly, it is conceivable to move a data input task (image data 10) from the task buffer 710 on the distribution server 610 side to the task buffer 720 on the distribution server 620 side, and cause the data input task to be distributed by the distribution server 620. However, the task information 20 related to the moved data input task (image data 10) is stored in the task information database 910. Thus, in the task information database 920 on the distribution server 620 side, the task information 20 related to the moved data input task (image data 10) is not stored.

In other words, in order for the distribution server 620 to distribute the data input task (image data 10) moved to the task buffer 720, it is desirable to store the task information 20 related to the moved data input task (image data 10) in the task information database 920. To achieve the above, it is sufficient to synchronize the task information database 910 and the task information database 920, for example. Synchronization refers to copying the stored task information 20 from each task information database 900 to the other. After synchronizing, the task information database 920 stores the task information 20 stored in the task information database 910.

However, executing the process of synchronizing the task information database 910 and the task information database 920 causes other processes to wait. In other words, in proportion to the wait time, lowered throughput, delayed response, and the like occur in the distribution server system, and the processing time becomes longer.

This is because the image data 10 and the task information 20 related to data input tasks are being stored split up between the task buffers 700 and the task information databases 900.

On the other hand, in the distribution server system applying the fourth exemplary embodiment illustrated in FIG. 19A, since the image data 10 and the corresponding task information 20 related to a data input task are stored as a pair, when a data input task is moved among multiple task buffers 700, the task information 20 is also moved in addition to the image data 10. Thus, it is not necessary to provide a task information database is not necessary, nor is it necessary to synchronize multiple task information databases. With this arrangement, lengthy processing times in the task distribution system are reduced. Additionally, with the configuration illustrated in FIG. 19A, even in the case in which there are multiple distribution servers 600, data input tasks are distributed efficiently and correctly, while in addition, management of the progress of data input tasks (input processes) becomes easy.

Next, FIG. 20B will be described. In FIG. 20B, there are two distribution servers 600 (distribution servers 610 and 620). Furthermore, the distribution servers 600 (distribution servers 610 and 620) are respectively provided with task information databases 900 (task information databases 910 and 920) that store task information 20. However, there is one each of the task buffer 700 and the operator buffer 800, which are shared between the two distribution servers 600 (distribution servers 610 and 620).

However, the task information database 910 is connected to the distribution server 610, and stores task information 20 related to data input tasks whose distribution is handled by the distribution server 610. Similarly, the task information database 920 is connected to the distribution server 620, and stores task information 20 related to data input tasks whose distribution is handled by the distribution server 620. In this case, the task buffer 700 stores image data 10 related to data the input tasks.

The task buffer 700 holds three data input tasks (image data 109, and in the operator buffer 800, three operators are registered. Additionally, assume that in the task information database 910 connected to the distribution server 610, the task information 20 related to the three data input tasks (image data 10) is stored.

At this time, even if the distribution server 620 distributes a data input task held in the task buffer 700 to an operator 30 registered in the operator buffer 800 for execution, in the task information database 920 accessible by the distribution server 620, the task information 20 related to the data input task (image data 10) is not stored. Thus, the data input task is not distributed. In this case, in order for the distribution server 620 to distribute the data input task, it is desirable for the task information database 920 to store the task information 20 related to the data input task (image data 10). To achieve the above, it is sufficient to synchronize the task information database 910 and the task information database 920, as described earlier. However, executing the synchronization process causes other processes to wait, by which lowered throughput, delayed response, and the like occur in the distribution server system, and the processing time becomes longer.

On the other hand, in the distribution server system applying the fourth exemplary embodiment illustrated in FIG. 19B, since the image data 10 and the corresponding task information 20 related to a data input task are stored as a pair, it is not necessary to provide a task information database, nor is it necessary to synchronize multiple task information databases. With this arrangement, lengthy processing times in the task distribution system are reduced. Additionally, with the configuration illustrated in FIG. 19B, even in the case in which there are multiple distribution servers 600, data input tasks are distributed efficiently and correctly, while in addition, management of the progress of data input tasks (input processes) becomes easy.

As described above, in the distribution server system, multiple data input tasks related to multiple data entries are handled in parallel. In this case, if the distributors (distributors 100, 400, 500, 510, 520, and 530) described in the first exemplary embodiment to the third exemplary embodiment are used as the distribution server 600, the task information 20 related to data input tasks are acquired, and the data input task to perform next is decided on the basis of the acquired task information 20. In other words, the distribution server 600 does not need to manage progress information related to the data input tasks. In other words, by deciding the next data input task on the basis of the task information 20, the management of progress information related to data input tasks becomes easy.

It is sufficient to configure the task decision unit 120 of the distributors (distributors 100, 400, 500, 510, 520, and 530) such that the data input task to perform next is decided on the basis of the task information 20. As described in the first exemplary embodiment to the third exemplary embodiment, the task decision unit 120 may be configured to make the decision of the data input task (input process) to perform next according to various processing logic. In other words, the task decision unit 120 may be configured according to processing logic other than the logic described in the first exemplary embodiment to the third exemplary embodiment.

The foregoing describes operators as human beings, but the operators are not necessarily required to be human beings. For example, an operator may also be an apparatus with higher accuracy and higher running costs than an OCR apparatus used for ordinary character recognition. For example, an operator may also be an OCR apparatus that executes a time-consuming but highly accurate OCR process. Such an apparatus has high running costs. However, if data input tasks are distributed using the distributors described in the foregoing, the number of data input tasks (steps) performed using the highly accurate OCR apparatus is reduced. Thus, running costs are reduced even when the highly accurate OCR apparatus is used.

Also, although data entry is described as an example, but the present disclosure may also be applied to other processes for converting data.

Note that it is also possible for a program to cause a computer to function as an acquisition unit that acquires process information, which is information associated with a reference image and about an input process performed by referencing the reference image, and as a process decision unit that decides the content of the next input process to perform by referencing the reference image, on the basis of the process information acquired by the acquisition unit. At this time, the program may be provided stored in a storage medium, or provided via a communication medium. In this case, the present disclosure may also be interpreted as a "non-transitory computer-readable recording medium storing a program".

A "non-transitory computer-readable recording medium storing a program" refers to a computer-readable recording medium upon which a program is recorded, and which is used to install, execute, and distribute the program, for example.

Note that the recording medium may be a DVD based on the specifications designed by the Digital Versatile Disc (DVD) Forum, a Compact Disc (CD), a Blu-ray Disc (registered trademark), a magneto-optical (MO) disc, a flexible disk (FD), magnetic tape, an HDD, ROM, flash memory, or the like.

The foregoing describes exemplary embodiments of the present disclosure. Various modifications and substitutions that do not depart from the scope of the technical ideas of the present disclosure are also included in the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    an acquisition unit that acquires process information associated with a reference image and regarding an input process performed by referencing the reference image; and
    a process decision unit that decides a content of a next input process to perform by referencing the reference image, on a basis of the process information acquired by the acquisition unit,
    wherein the process detection unit determines a number of already-performed data input tasks, and, when the number is below a predetermined number, the process decision unit proceeds to select an operator for the next input process and when the number is the predetermined number or more, the process decision unit compares already-performed data input results and determines whether the results are matching.

2. The information processing apparatus according to claim 1, wherein
    in a case in which the number of input processes in the process information is the predetermined number or more, the process decision unit decides to perform a new input process if the results are non-matching.

3. The information processing apparatus according to claim 1, wherein
    in a case in which the number of input processes in the process information is the predetermined number or more, the process decision unit decides to end processing if the results are matching.

4. The information processing apparatus according to claim 1, further comprising:
    a process information output unit that outputs process information regarding a result of the input process.

5. The information processing apparatus according to claim 4, wherein
    the process information includes the result of the input process and information regarding an inputter that performed the input process.

6. The information processing apparatus according to claim 5, wherein
    in a case of performing the next input process, on a basis of the process information, the process decision unit decides to cause a new input process to be performed by an inputter different from the inputter that performed the input process previously.

7. The information processing apparatus according to claim 1, further comprising:
    a process request unit that requests an input unit to perform the next input process decided by the process decision unit.

8. The information processing apparatus according to claim 7, further comprising:
    a result acquisition unit that acquires a result of the input process from the input unit.

9. A non-transitory computer readable medium storing a program causing a computer to execute a process for processing information, the process comprising:
    acquiring process information associated with a reference image and regarding an input process performed by referencing the reference image; and
    deciding a content of a next input process to perform by referencing the reference image, on a basis of the acquired process information,
    wherein deciding includes determining a number of already-performed data input tasks, and, when the number is below a predetermined number, deciding proceeds to select an operator for the next input process and when the number is the predetermined number or more, the deciding compares already-performed data input results and determines whether the results are matching.

* * * * *